US006546616B2

(12) United States Patent
Radowick

(10) Patent No.: US 6,546,616 B2
(45) Date of Patent: Apr. 15, 2003

(54) SIX-AXIS ALIGNMENT AND INSTALLATION TOOL

(75) Inventor: Dennis G. Radowick, Euless, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 105 days.

(21) Appl. No.: 09/738,211

(22) Filed: Dec. 15, 2000

(65) Prior Publication Data

US 2002/0073535 A1 Jun. 20, 2002

(51) Int. Cl.[7] ............................................. B23G 03/00
(52) U.S. Cl. ............................. 29/720; 29/466; 29/467; 29/559; 29/281.1; 29/281.5; 269/58; 269/71
(58) Field of Search ..................... 269/58, 71; 29/281.1, 29/281.4, 281.5, 281.6, 720, 464, 466, 467, 468, 559

(56) References Cited

U.S. PATENT DOCUMENTS

| | | | |
|---|---|---|---|
| 2,825,477 A | * | 2/1958 | Ross |
| 3,085,798 A | * | 4/1963 | Gavette |
| 3,247,979 A | * | 4/1966 | Melton et al. |
| 3,432,911 A | * | 3/1969 | Rodgers |
| 3,524,556 A | * | 8/1970 | Miller |
| 3,603,691 A | * | 9/1971 | Hamilton |
| 4,200,273 A | * | 4/1980 | Das Gupta et al. |
| 4,440,265 A | | 4/1984 | Spagnoli ...................... 182/129 |
| 4,461,455 A | | 7/1984 | Mills et al. .................. 254/3 R |
| 4,822,014 A | | 4/1989 | Buchler ........................ 269/71 |
| 5,873,165 A | * | 2/1999 | Bode et al. |
| 6,170,141 B1 | * | 1/2001 | Rossway et al. |

FOREIGN PATENT DOCUMENTS

| | | | |
|---|---|---|---|
| FR | 2449057 | 9/1980 | ............. B66F/9/12 |
| WO | WO 00/56638 | 9/2000 | ............. B65G/7/02 |

OTHER PUBLICATIONS

European Search Report for counterpart European Patent Application No. 01204895.5, Apr. 24, 2002.

* cited by examiner

*Primary Examiner*—Gregory M. Vidovich
*Assistant Examiner*—Eric Compton
(74) *Attorney, Agent, or Firm*—James E. Walton; Hill & Hunn, LLP

(57) ABSTRACT

A six-axis alignment and installation tool having a multi-component base unit and a plurality of multi-component interchangeable units. Some of the degrees of freedom are provided by the components of the base unit, and the remaining degrees of freedom are provided by the components of each interchangeable units. The alignment and installation tool has two modes of transportation: levitation by air bearings, and rolling by removable casters.

20 Claims, 39 Drawing Sheets

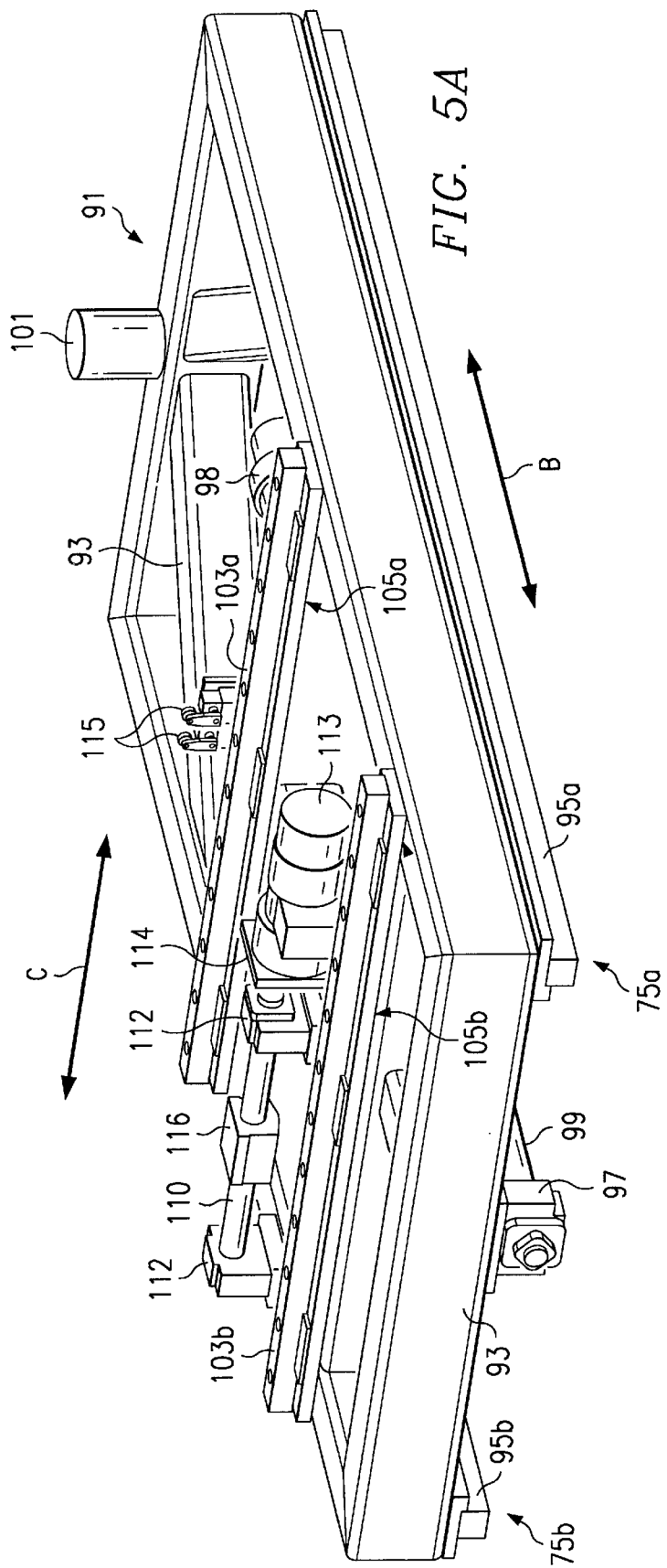

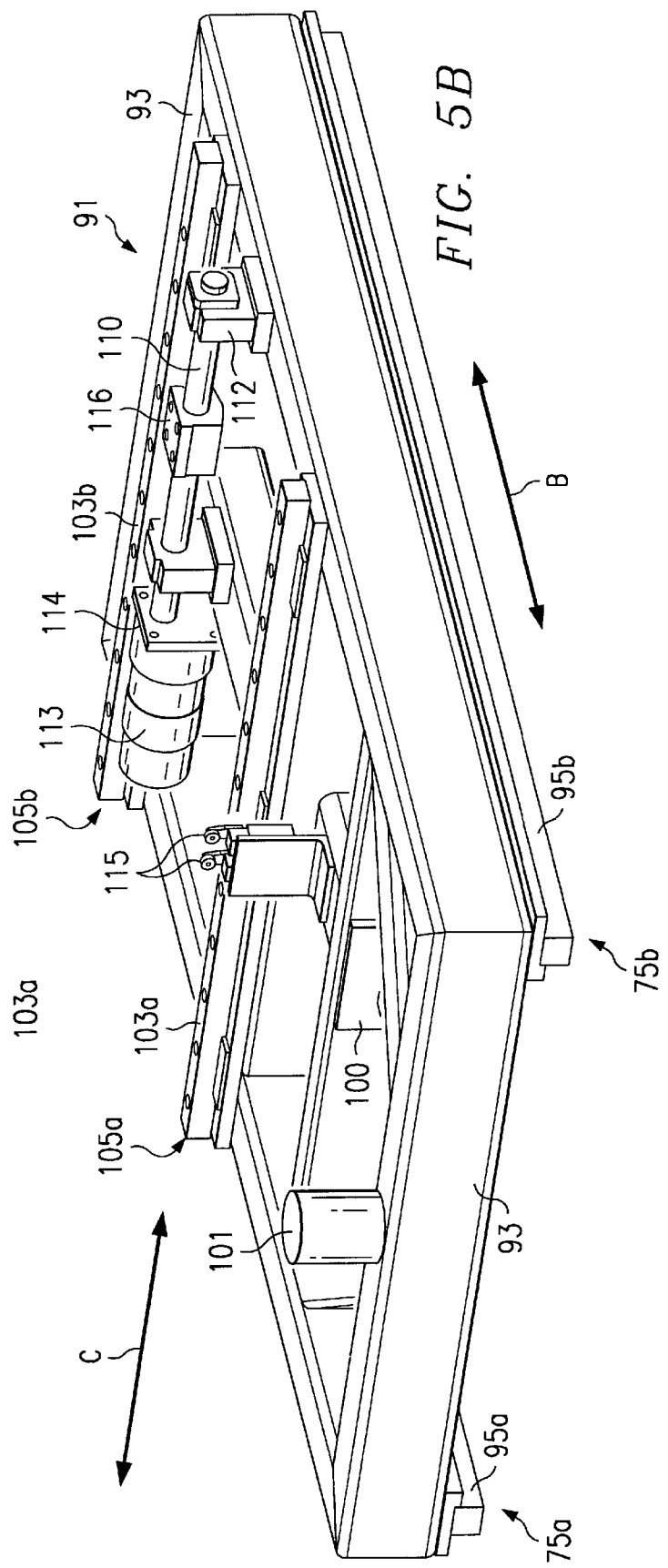

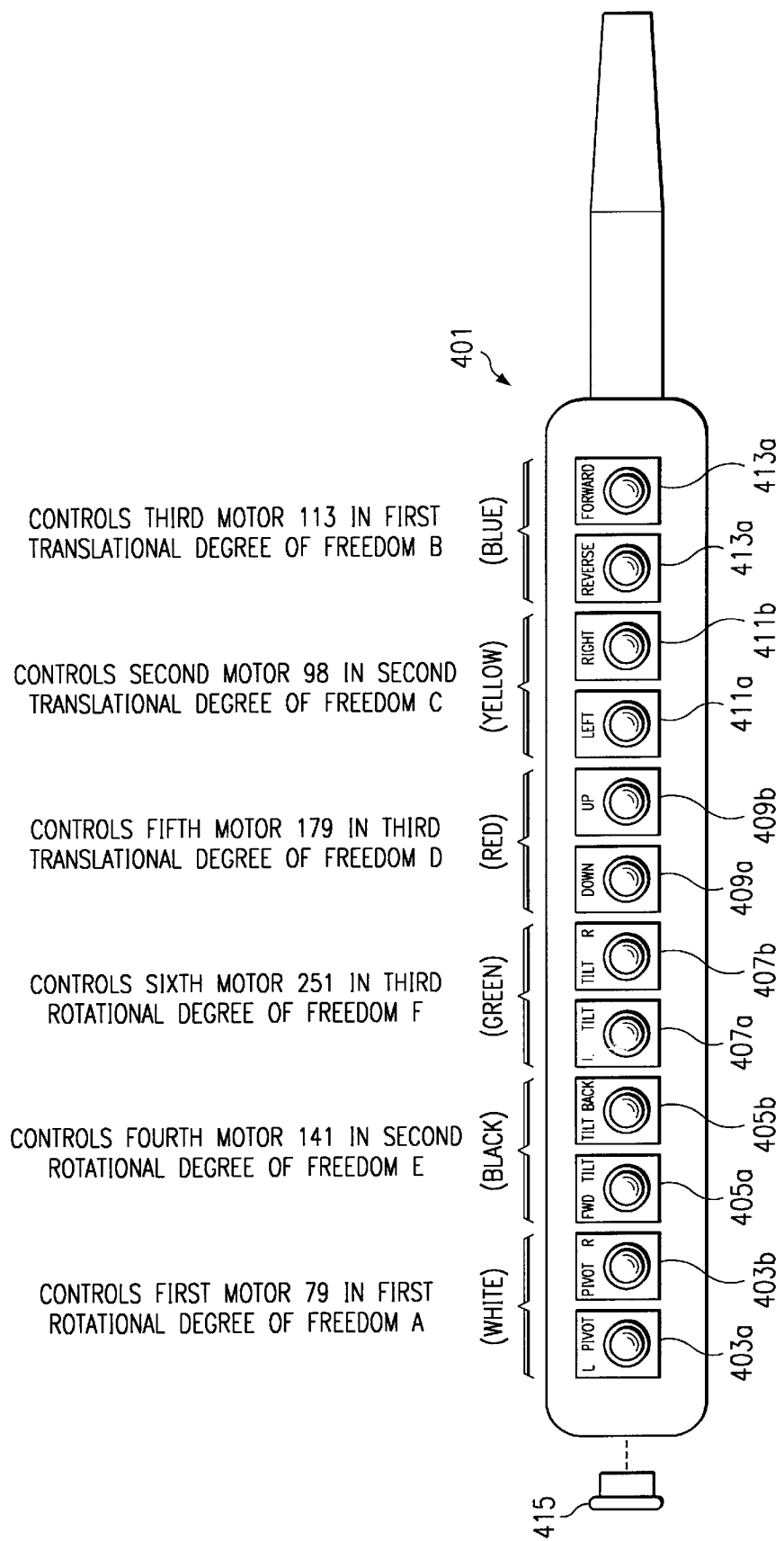

SIX-AXIS ALIGNMENT AND INSTALLATION TOOL

BACKGROUND ART

1. Field of the Invention

The present invention relates in general to alignment and installation tools. In particular, the present invention relates to high-precision, six-axis alignment and installation tools.

2. Description of Related Art

In manufacturing large machines, such as aircraft, it is often necessary to maneuver large, heavy components together for assembly. These operations typically require a large number of personnel and the use of large overhead cranes. Assembling these large components is time and labor intensive, and can often tie up manufacturing resources for many hours. In addition, the risk of damage to one or all of the components being assembled is quite high, due to the limited amount of control that the operators have over large overhead cranes.

For example, installing a tilt rotor nacelle onto the wing of a tilt rotor aircraft can take up to twelve hours, require up to twenty people, and tie up a large overhead crane for the entire process. The nacelle must be precisely hoisted, aligned, and installed onto the wing of the aircraft without damaging either the nacelle or the wing. Clearances can be as little as 0.002 inches. It is practically impossible to achieve an acceptable level of precision using these methods. To compound the matter, this operation must be repeated for the other nacelle and the other wing of the aircraft. In addition, it is not possible to move these overhead cranes out of the assembly plant.

There are many other applications in which large, heavy machine components must be hoisted, aligned, and assembled together in a precise manner.

BRIEF SUMMARY OF THE INVENTION

There is a need for a six-axis alignment and installation tool for precisely hoisting, aligning, and maneuvering large, heavy machine components so that they can be assembled together.

Therefore, it is an object of the present invention to provide a six-axis alignment and installation tool for precisely hoisting, aligning, and maneuvering large, heavy machine components.

It is another object of the present invention to provide a six-axis alignment and installation tool having a base unit and a plurality of interchangeable units, wherein the base unit provides some of the degrees of freedom, and each interchangeable unit provides the remaining degrees of freedom.

It is another object of the present invention to provide a six-axis alignment and installation tool having a base unit and a plurality of interchangeable units, wherein the base unit provides five of the degrees of freedom, and each interchangeable unit provides the remaining degree of freedom.

It is another object of the present invention to provide a six-axis alignment and installation tool for installing tilt rotor nacelles onto the wings of tilt rotor aircraft.

It is another object of the present invention to provide a six-axis alignment and installation tool having two modes of transportation, such that the tool may be transported from a controlled environment, such as within an assembly plant, to an uncontrolled environment, such as an outside runway or tarmac.

The above objects are achieved by providing a six-axis alignment and installation tool having a multi-component base unit, and a plurality of multi-component interchangeable units, wherein the components of the base unit translate and rotate relative to each other in five degrees of freedom, and the components of each interchangeable unit rotate relative to each other in one degree of freedom, the tool having two modes of transportation.

The alignment and installation tool of the present invention has many advantages over current methods of assembling large machine components. With the alignment and installation tool and the methods of the present invention, significant savings in time, labor, and materials are realized. Nacelles can be installed onto tilt rotor aircraft with fewer people and in a significantly reduced amount of time. Because the alignment and installation tool of the present invention can maneuver a nacelle with very high precision, the risk of damage to these expensive parts is dramatically reduced. Because the alignment and installation tool of the present invention has two modes of transportation, the tool may be transported from a controlled environment to an uncontrolled environment to perform certain repairs, or repair steps, without bringing the machine or its components into the assembly plant. The present invention improves safety by reducing the number of people required to install a nacelle, by eliminating the need for overhead cranes, and by reducing the time required to perform the assembly process.

The above, as well as, additional objects, features, and advantages of the present invention will become apparent in the following detailed description.

BRIEF DESCRIPTION OF THE DRAWINGS

FIG. 5A is a front perspective view of an upper plate component of the tool of FIG. 1A.

FIG. 5B is a rear perspective view of the upper plate component of FIG. 5A.

FIG. 21 is a top view of a portable control pendant for operating the tool of FIG. 1A.

DETAILED DESCRIPTION OF THE PREFERRED EMBODIMENT

Figure 1A:
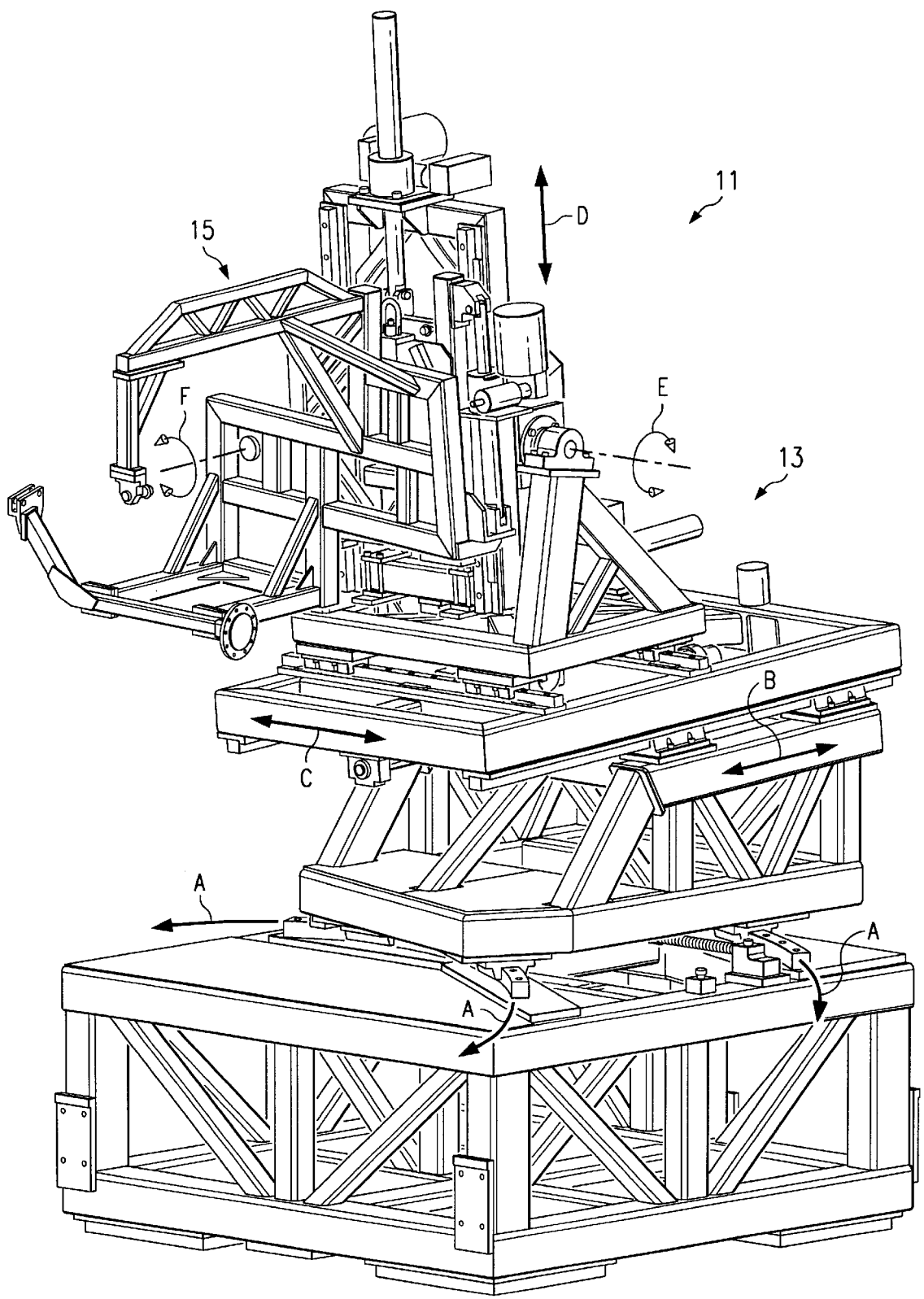
FIG. 1A is a front perspective view of the six-axis alignment and installation tool according to the present invention.
Figure 1B:
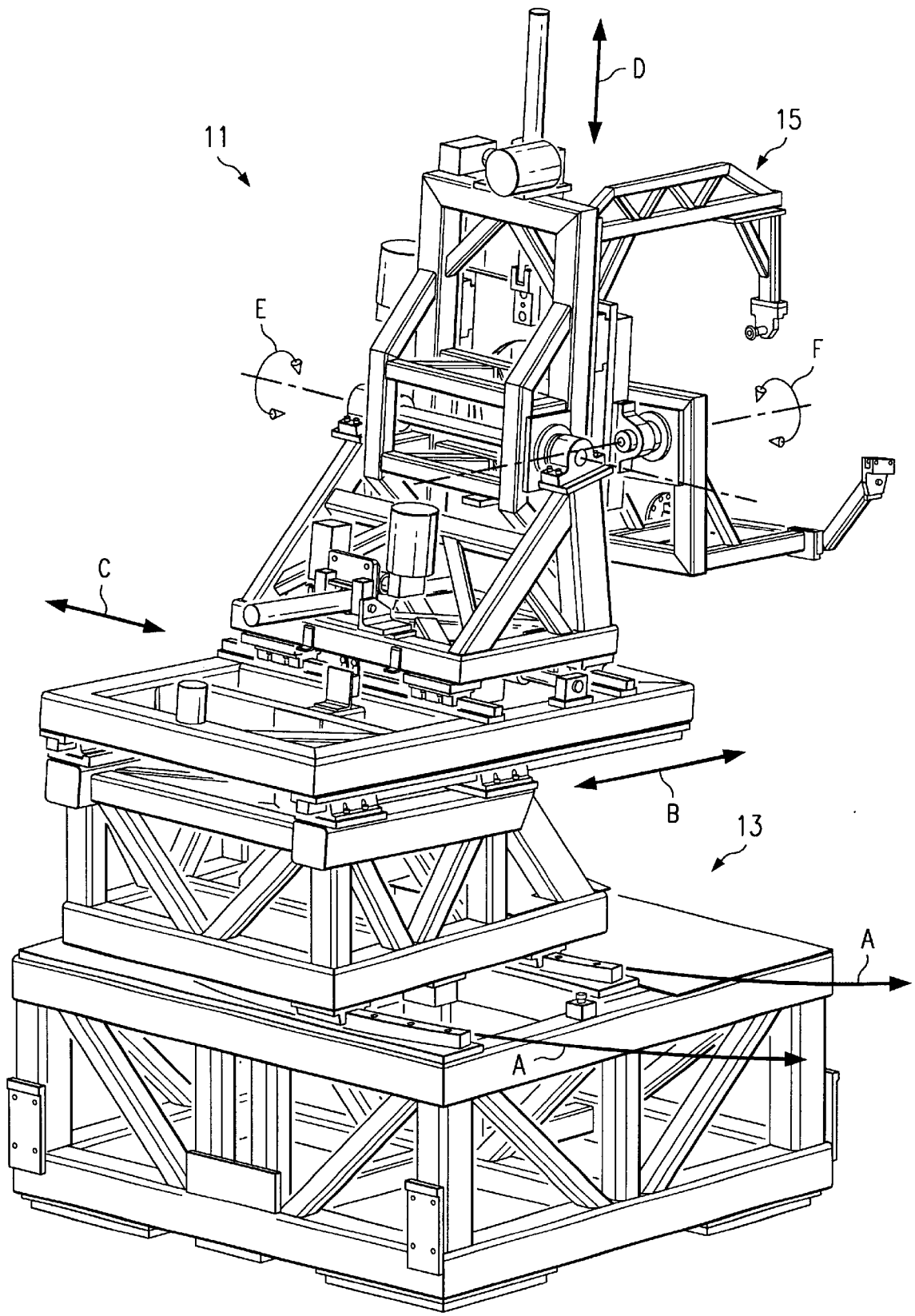
FIG. 1B is a rear perspective view of the tool of FIG. 1A.

Referring to FIGS. 1A and 1B in the drawings, numeral 11 illustrates a six-axis tool according to the present invention. Tool 11 is a multi-component tool having six degrees of freedom: translation along three axes, and rotation about three axes. In the preferred embodiment, five of these degrees of freedom are accomplished by components that are assembled together into a base unit 13; while one of the degrees of freedom is obtained by a plurality of interchangeable units 15 that are releasably coupled to base unit 13. It should be understood that interchangeable unit 15 may include components that achieve more than one degree of freedom. Base unit 13 includes components which provide the following degrees of freedom: a first rotational degree of freedom indicated by arrow A; a first translational degree of freedom indicated by arrow B; a second translational degree of freedom indicated by arrow C; a third translational degree of freedom indicated by arrow D; and a second rotational degree of freedom indicated by arrow E. Interchangeable unit 15 includes components which provide a third rotational degree of freedom indicated by arrow F.

Figure 18:
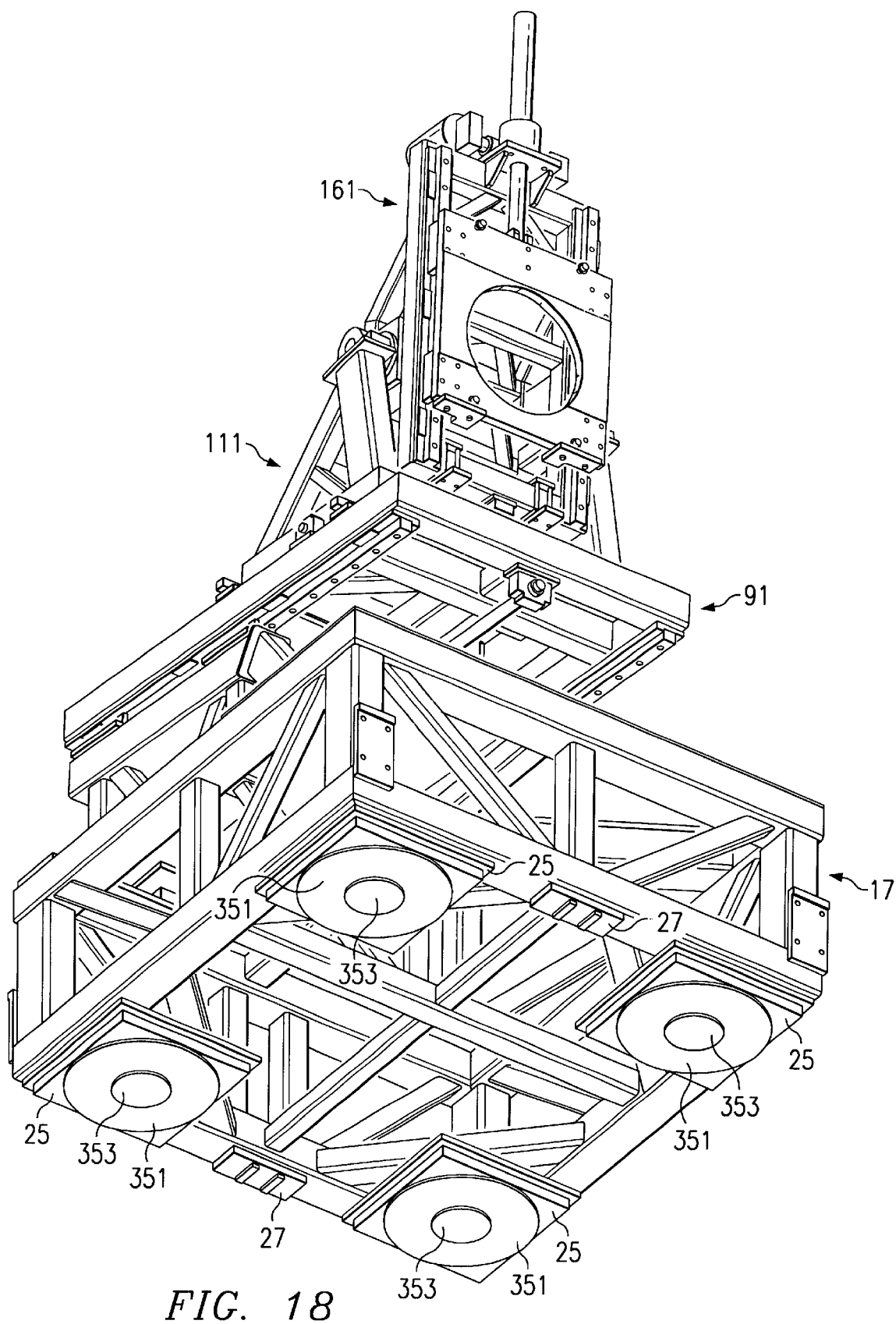
FIG. 18 is a bottom perspective view of the tool of FIG. 1A, as assembled in FIG. 12.
Figure 19:
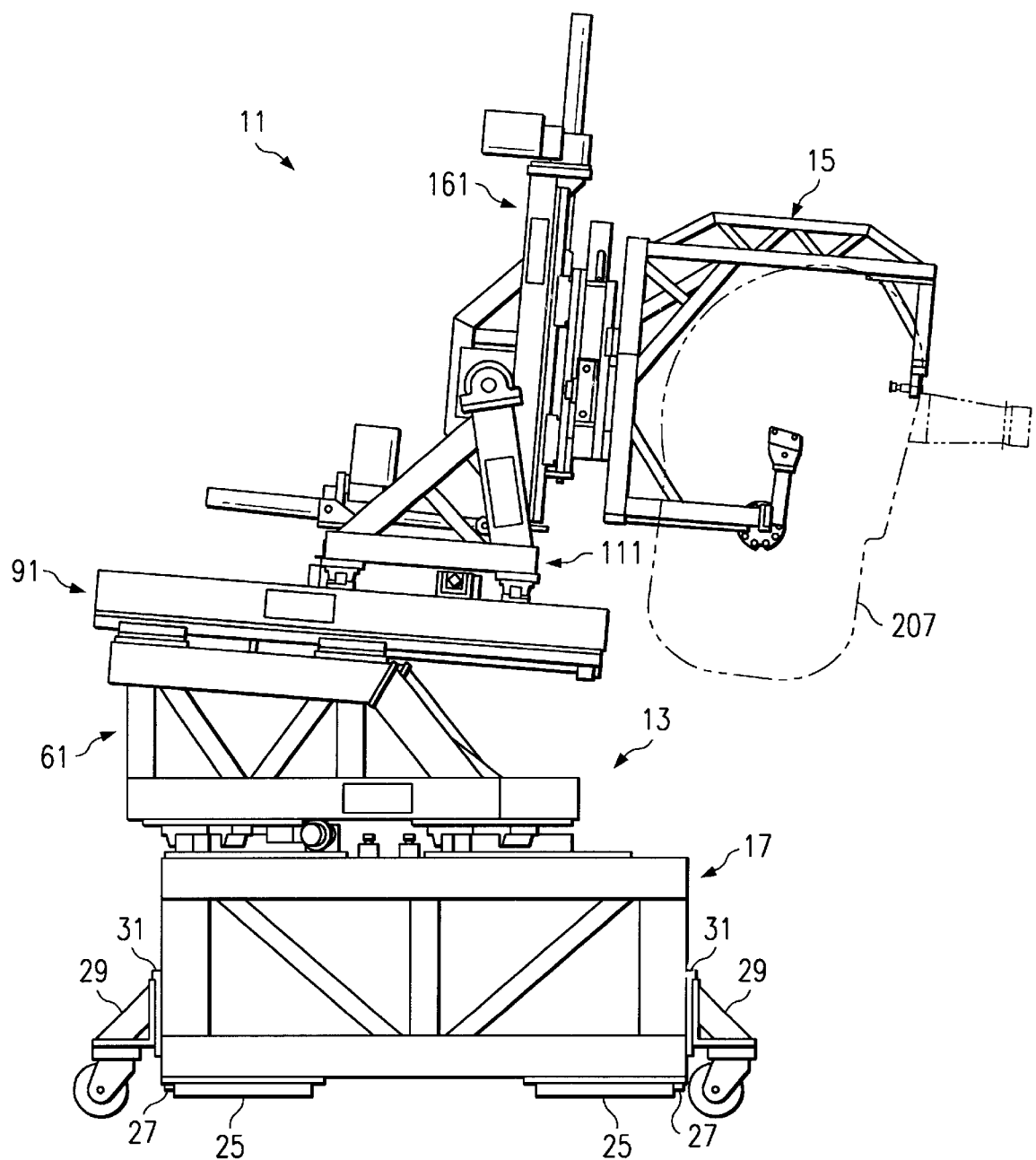
FIG. 19 is a left side view of the tool of FIG. 1A with removable casters installed.

The various components of tool 11 are shown individually and at different stages of assembly in FIGS. 2–16. In particular, the components of base unit 13 are illustrated in FIGS. 2–12, and the components of interchangeable unit 15 are illustrated in FIGS. 13—16. Tool 11 generally operates between a retracted position and an extended position. This different modes are illustrated in FIGS. 17A–17D. Although it is preferred that tool 11 be used in a "controlled" environment, tool 11 is configured to be transitioned and used in an "uncontrolled" environment. An example of a controlled environment would be a smooth, flat shop floor of an assembly line in an aircraft assembly plant. An example of an uncontrolled environment would be a rough, asphalt tarmac outside of an aircraft assembly plant. A first transportation mode is illustrated in FIG. 18, and a second transportation mode is illustrated in FIG. 19. The procedure for making the transition is illustrated in FIGS. 20A–20E. The control electronics of tool 11 are discussed with reference to FIGS. 21–24B. Finally, the procedure for using tool 11 in its preferred application of installing a tilt rotor nacelle onto a tilt rotor aircraft wing is illustrated in FIGS. 25A–25I.

Figure 2:
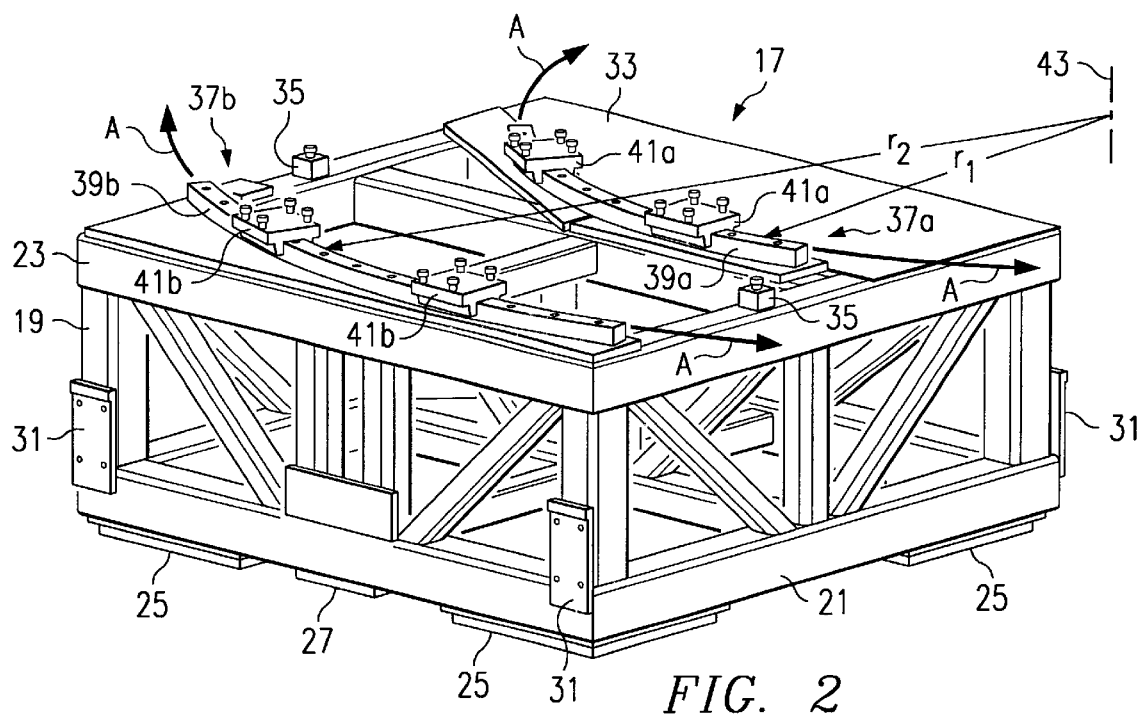
FIG. 2 is a rear perspective view of a base support component of the tool of FIG. 1A.

Referring now to FIG. 2 in the drawings, a base support component 17 of base unit 13 is illustrated. Base support component 17 is made of a strong, rigid material, such as iron or steel. Base support component 17 preferably includes a truss-type frame assembly 19 having a lower frame 21 and an upper frame 23. A plurality of conventional air bearings 25 are coupled to lower frame 21. Air bearings 25 allow tool 11 to be levitated and moved while hovering on a cushion of compressed air from a source of compressed air (not shown). Air bearings 25 are used when tool is in a controlled environment in which the floor is relatively flat and smooth. This controlled environment would preferably be the shop floor of an aircraft assembly plant. Air bearings 25 will be discussed in more detail with respect to FIG. 18. At least one jack pad 27 is coupled to lower frame 21 to aid in attaching a conventional jack (not shown) to raise tool 11 so that a plurality of casters 29 (see FIG. 19) may be coupled to base support component 17 at caster attachment pads 31. It is preferred that a standing platform 33 be coupled to upper frame 23 so that a user may inspect and monitor tool 11 and observe its load during operation. At least one emergency stop button 35 is provided to allow all movement of tool 11 to be halted at any time during operation. At least two curved bearings 37a and 37b are carried by upper frame 23. Curved bearing 37a includes a rail portion 39a and at least one slide unit 41a that slidingly mates with rail portion 39a. Likewise, curved bearing 37b includes a rail portion 39b and at least one slide unit 41 b that slidingly mates with rail portion 39b. Curved bearing 37a has a radius of curvature $r_1$ about a generally vertical axis 43; and curved bearing 37b has a radius of curvature $r_2$ about axis 43. First rotational degree of freedom indicated by arrow A is along radii of curvature $r_1$ and $r_2$ about axis 43.

Figure 3A:
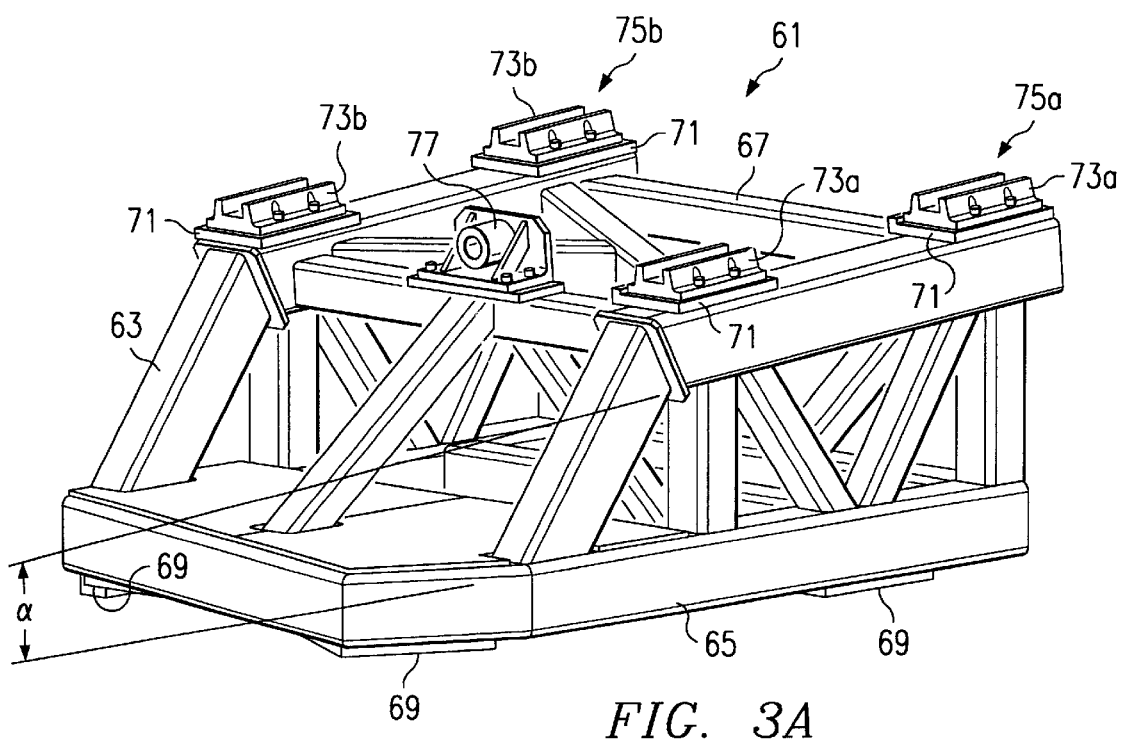
FIG. 3A is a front perspective view of a mid-level component of the tool of FIG. 1A.
Figure 3B:
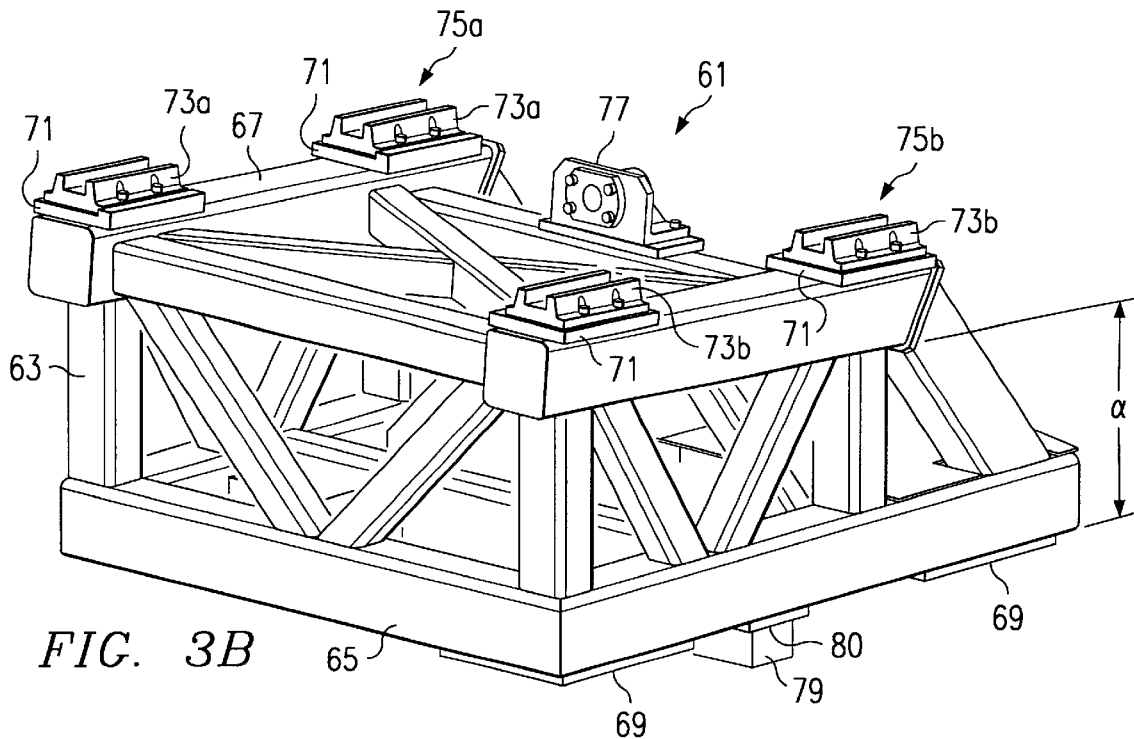
FIG. 3B is a rear perspective view of the mid-level component of FIG. 3A.

Referring now to FIGS. 3A and 3B in the drawings, a mid-level component 61 of base unit 13 is illustrated. Mid-level component 61 is made of a strong, rigid material, such as iron or steel. Mid-level component 61 includes a truss-type frame assembly 63 having a lower frame 65 and an upper frame 67. A plurality of attachment pads 69 are coupled to lower frame 65 to facilitate the attachment of slide units 41a and 41b of curved bearings 37a and 37b, respectively. In this manner, mid-level component 61 pivots about axis 43 relative to base support component 17 along curved bearings 37a and 37b. Mid-level component 61 rotates relative to base support component 17 about axis 43 along curved bearings 37a and 37b due to the actuation of a first conventional electric motor 79 that is coupled to lower frame 65 at a mounting bracket 80. A threaded shaft 81 (see FIG. 6) extends from motor 79 and is coupled to a mounting bracket 82 (see FIG. 6) that is coupled to upper frame 23 of base support component 17. A plurality of upper attachment pads 71 are coupled to upper frame 67 to facilitate the attachment of a plurality of slide units 73a and 73b of linear bearings 75a and 75b. A ball screw nut 77 is coupled to upper frame 67 to receive a ball screw 99 (see FIG. 5A) to facilitate translation of an upper plate component 91 (see FIGS. 5A and 5B) relative to mid-level component 61.

The curved travel of mid-level component 61 relative to base support component 17 is limited by limit switches, which are internal to first motor 79, and which are activated by conventional internal sensors (not shown). In this manner, slide units 41a and 41b are prevented from sliding off of rail portions 39a and 39b, respectively.

As stated above, the preferred application for six-axis alignment and installation tool 11 of the present invention is to precisely hoist, align, and install both the left-side and right-side tilt rotor nacelles onto the wings of a tilt rotor aircraft. The wings of the tilt rotor aircraft typically incline in an upward direction as the wings extend from the fuselage of the aircraft to the tips of the wings. To accommodate this inclination, upper frame 67 is not parallel with lower frame 65 of mid-level component 61; rather, upper frame 67 slopes downwardly toward lower frame 65 at an angle α from the rear of mid-level component 61 toward the front of mid-level component 61. In the preferred embodiment, angle α is about four degrees. It should be understood that upper frame 67 may be level with or form a wide range of angles α with lower frame 65 depending upon the application in which tool 11 is being used.

Figure 4:
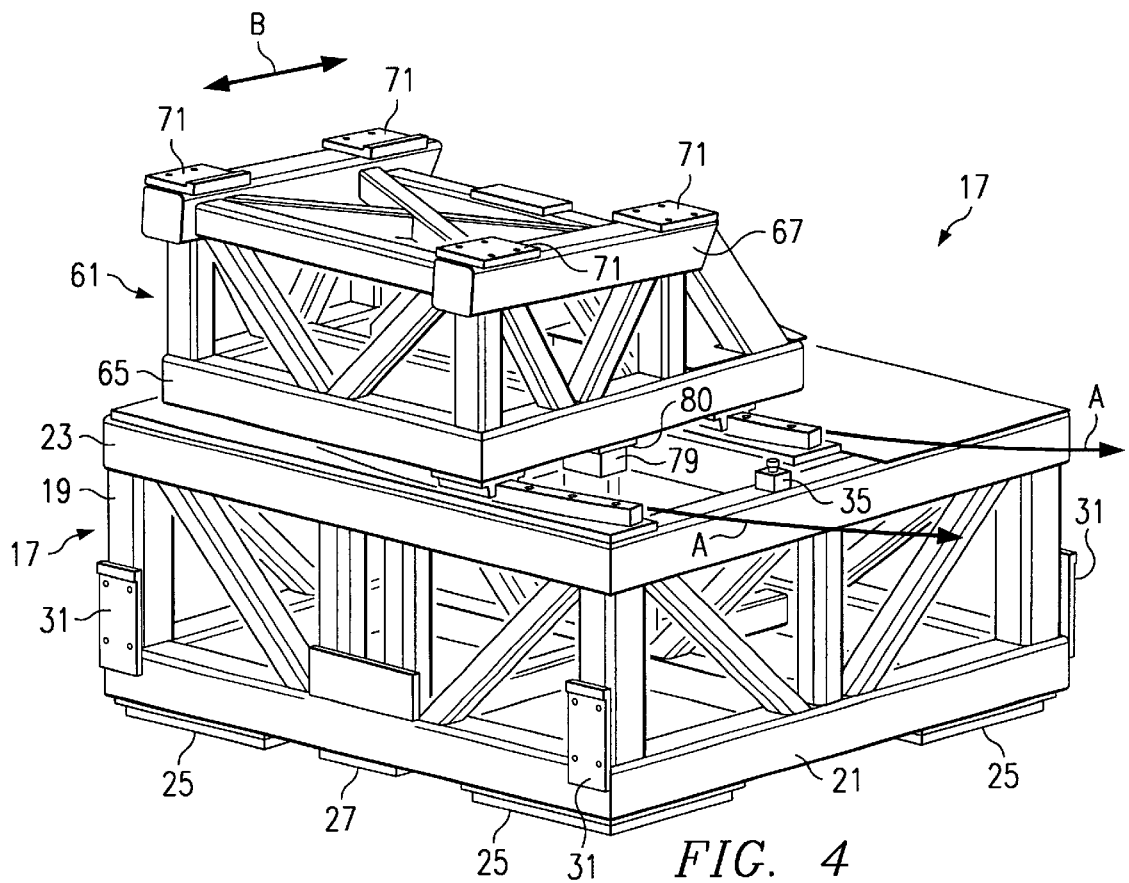
FIG. 4 is a rear perspective view of the base support component of FIG. 2 and the mid-level component of FIG. 3B assembled together.

Referring now to FIG. 4 in the drawings, base support component 17 and midlevel component 61 are illustrated assembled together in a rear perspective view.

Referring now to FIGS. 5A and 5B in the drawings, an upper plate component 91 of base unit 13 is illustrated. Upper plate component 91 is made of a strong, rigid material, such as iron or steel. Upper plate component 91 includes a plurality of frame support members 93. A plurality of rail portions 95a and 95b of linear bearings 75a and 75b are coupled to the underneath portion of frame support members 93. Slide units 73a and 73b slidingly mate with rail portions 95a and 95b, respectively, to form linear bearings 75a and 75b. A mounting bracket 97 and a second conventional electric motor 98 are coupled to the underneath portion of frame support members 93. Second motor 98 is coupled to frame support members 93 via a mounting bracket 100. Ball screw 99, which extends between second motor 98 and mounting bracket 97, passes through ball screw nut 77. As second motor 98 turns ball screw 99, ball screw nut 77 causes upper plate component 91 to translate relative to mid-level component 61 along linear bearings 75a and 75b. This translation corresponds to first translational degree of freedom B. In this manner, upper plate component 91 translates relative to mid-level support component 61 and parallel to upper frame 67.

The travel of upper plate component 91 relative to mid-level component 61 is limited by conventional limit switches that are activated when conventional sensors (not shown) make contact with a plurality of switch trip dogs (not shown) which are placed at selective locations along the line of travel of upper plate component 91. In this manner, slide units 73a and 73b are prevented from sliding off of rail portions 95a and 95b.

A conventional safety light 101 is preferably coupled to frame support members 93. Safety light 101 flashes when tool 11 is powered up and operational. It should be understood that other safety features, such as audible warning sirens and buzzers may be included as additional safety features.

A plurality of rail portions 103a and 103b of linear bearings 105a and 105b are coupled to the upper portion of frame support members 93. A plurality of slide units 127a and 127b (see FIGS. 7A and 7B) slidingly mate with rail portions 103a and 103b to form linear bearings 105a and 105b, respectively. Linear bearings 105a and 105b facilitate translation of a trunnion component 111 (see FIGS. 7A and 7B) relative to upper plate component 91. Trunnion component 111 translates relative to upper plate component 91 due to the actuation of a third conventional electric motor 113. Third motor 113 is coupled to frame support members 93 of upper plate component 91 at a mounting bracket 114. A ball screw 110 extends between third motor 113 and a plurality of mounting brackets 112 that are coupled to frame support members 93. Ball screw 110 passes through a ball screw nut 116 that is coupled to the underneath portion of trunnion component 111 at a mounting bracket 131 (see FIGS. 7A and 7B). As third motor 113 turns ball screw 110, ball screw nut 116 causes trunnion component 111 to translate relative to upper plate component 91 along linear bearings 105a and 105b. This translation corresponds to second translational degree of freedom C. In this manner, trunnion component 111 translates relative to and parallel to upper plate component 91.

Figure 6:
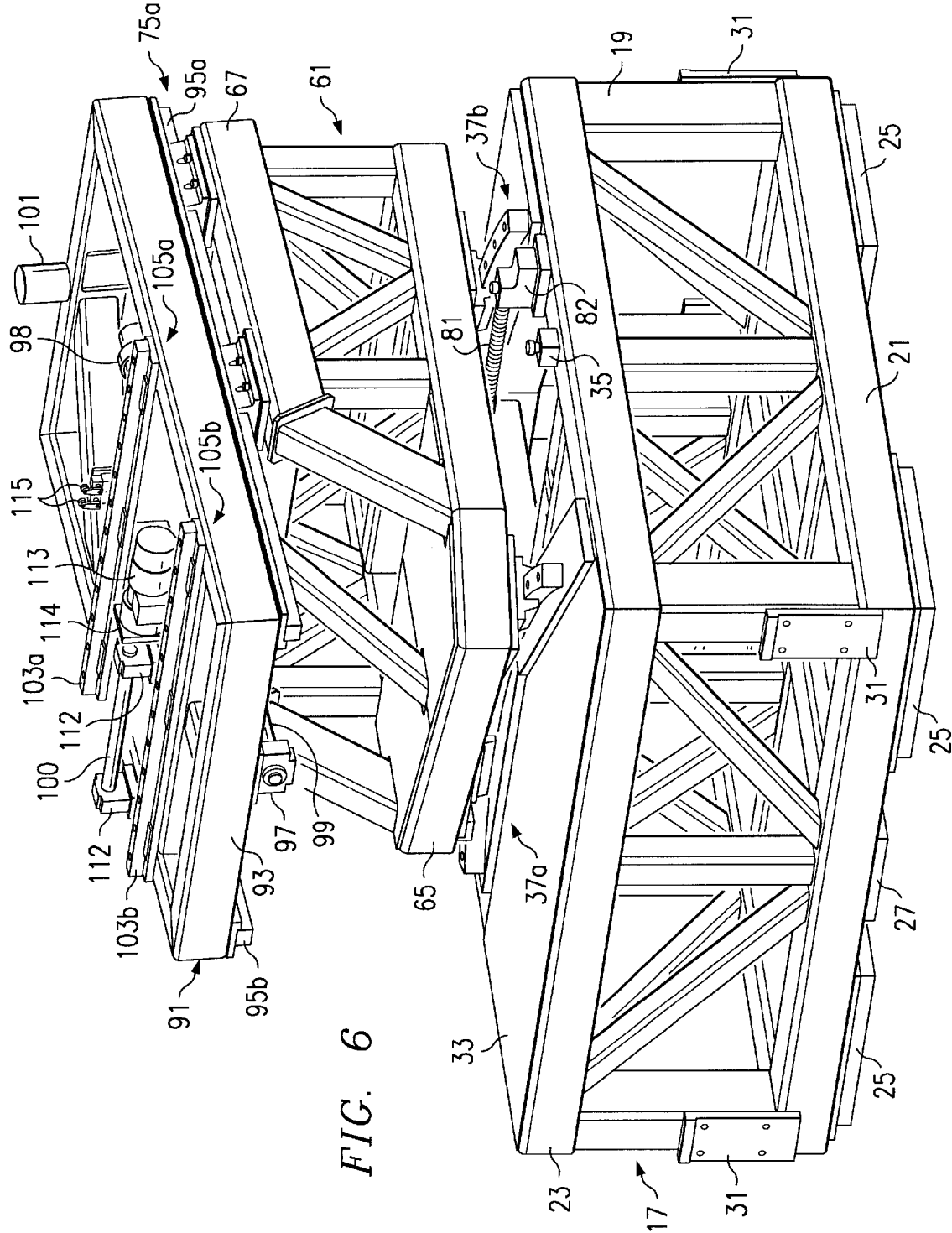
FIG. 6 is a front perspective view of the base support component of FIG. 2, the mid-level component of FIG. 3A, and the upper plate component of FIG. 5A assembled together.

Referring now to FIG. 6 in the drawings, base support component 17, mid-level component 61, and upper plate component 91 are illustrated assembled together in a front perspective view.

Figure 7A:
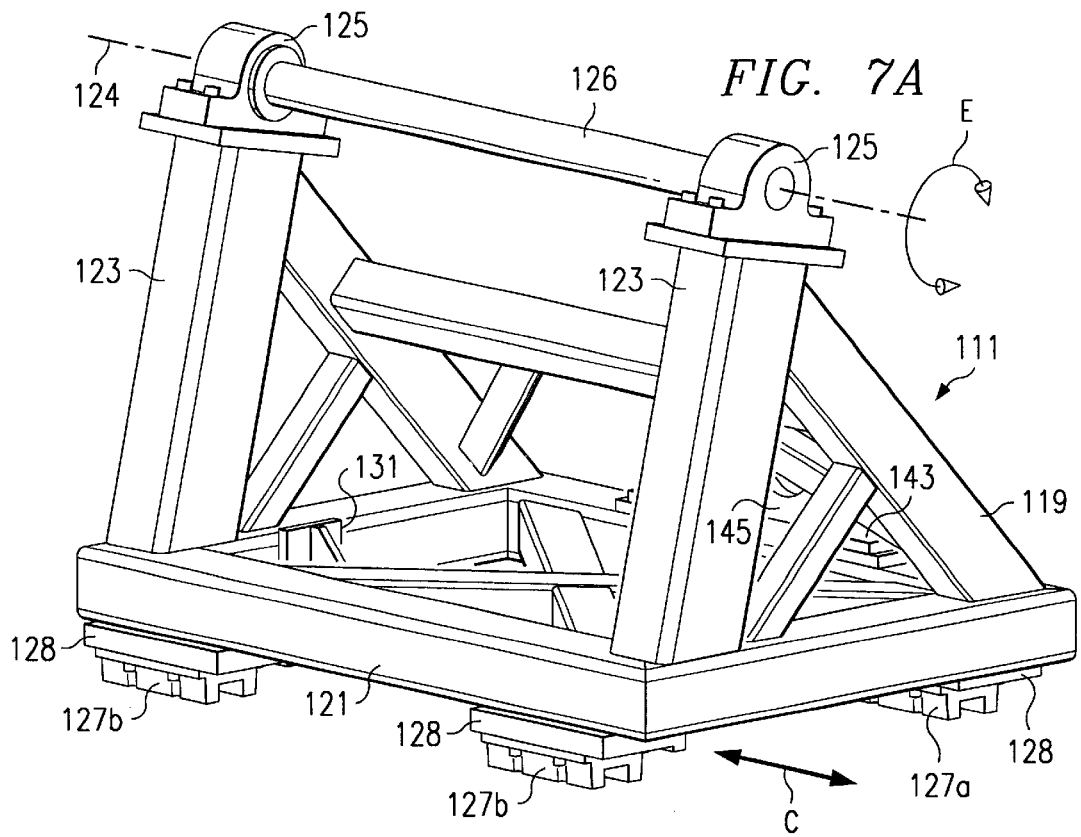
FIG. 7A is a front perspective view of a trunnion component of the tool of FIG. 1A.
Figure 7B:
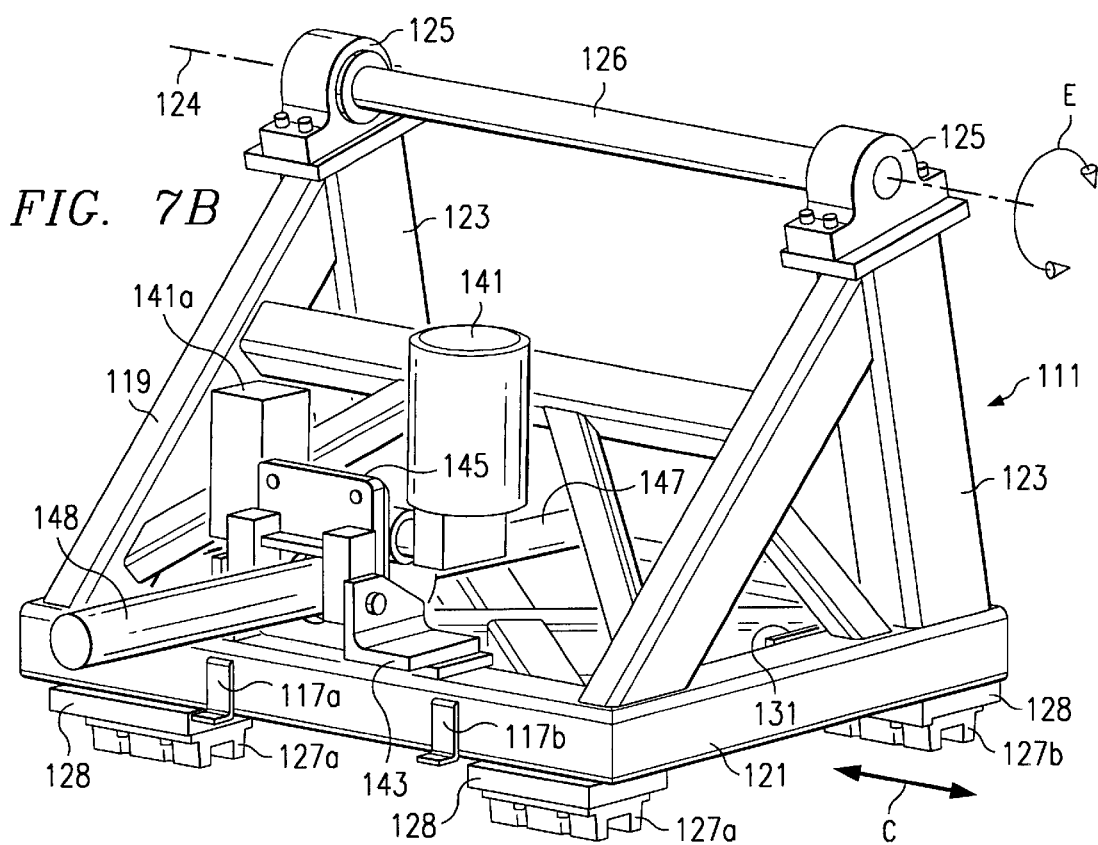
FIG. 7B is a rear perspective view of the trunnion component of FIG. 7A.

Referring now to FIGS. 7A and 7B in the drawings, trunnion component 111 of base unit 13 is illustrated. Trunnion component 111 is made of a strong, rigid material, such as iron or steel. Trunnion component 111 includes a truss-type frame assembly 119 having a lower frame 121 and generally upright members 123. A plurality of pillow block bearings 125 are disposed at the upper portion of upright members 123. An axle member 126 passes through pillow block bearings 125. Axle member 126 has a longitudinal axis 124. A plurality of attachment pads 128 are coupled to lower frame 121 to facilitate the coupling of slide units 127a and 127b to the lower portion of lower frame 121. The travel of trunnion component 111 relative to upper plate component 91 is limited by conventional limit switches 115. Limit switches 115 are activated by contact with a plurality of switch trip dogs 117a and 117b that are coupled to lower frame 121. In this manner, slide units 127a and 127b are prevented from sliding off of rail portions 103a and 103b. A fourth conventional electric motor 141 is coupled to lower frame 121 of trunnion component 111 at a mounting bracket 143. In the preferred embodiment, fourth motor 141 includes a limit switch box 141a to limit the range of fourth motor 141 and the travel of a threaded shaft 147. Mounting bracket 143 includes a pivoting housing member 145 through which threaded shaft 147 passes. When retracted, threaded shaft 147 is protected by a shaft housing 148.

Figure 8:
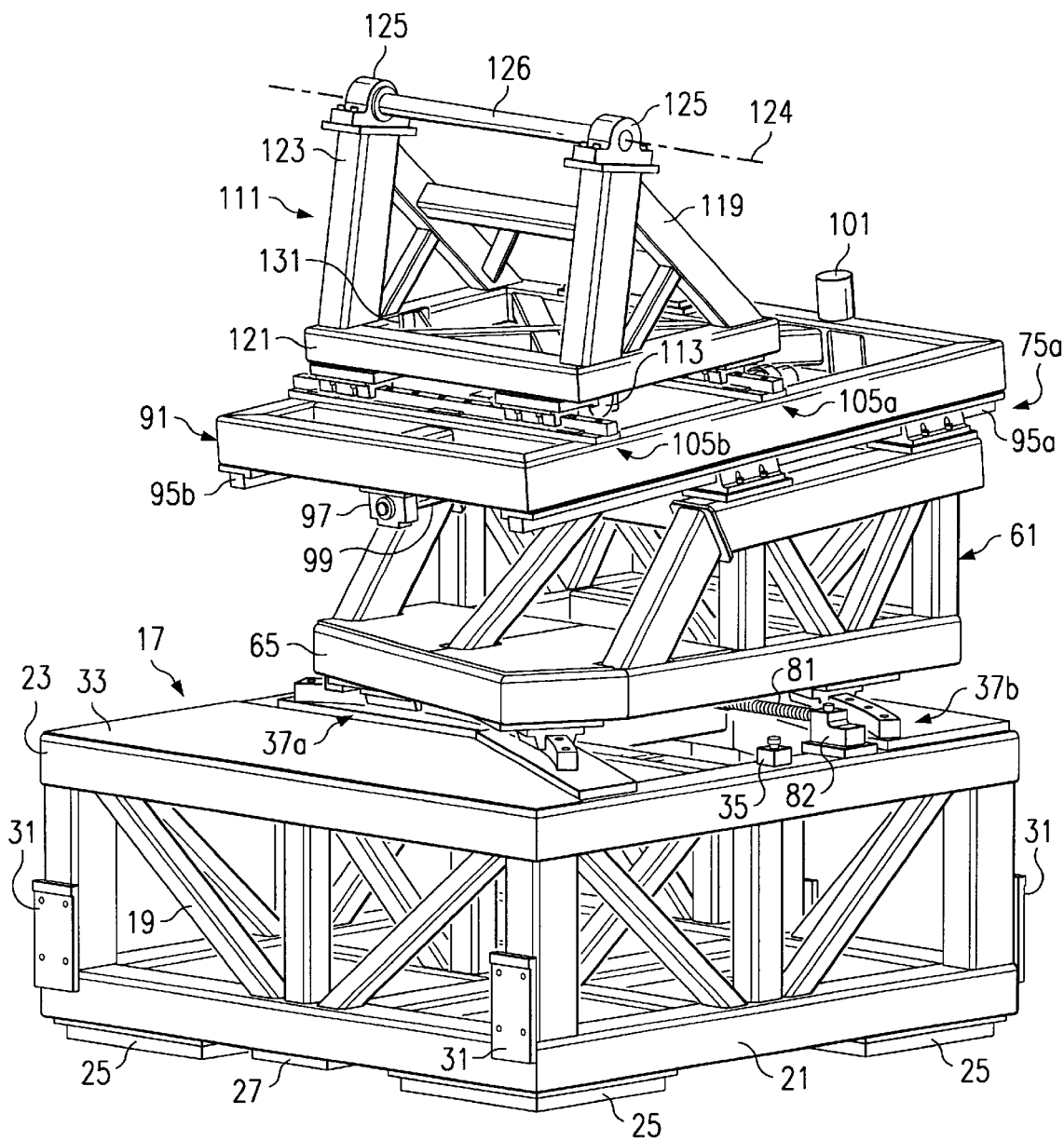
FIG. 8 is a front perspective view of the base support component of FIG. 2, the mid-level component of FIG. 3A, the upper plate component of FIG. 5A, and the trunnion component of FIG. 7A assembled together.

Referring now to FIG. 8 in the drawings, base support component 17, mid-level component 61, upper plate component 91, and trunnion component 111 are illustrated assembled together in a front perspective view.

Figure 9:
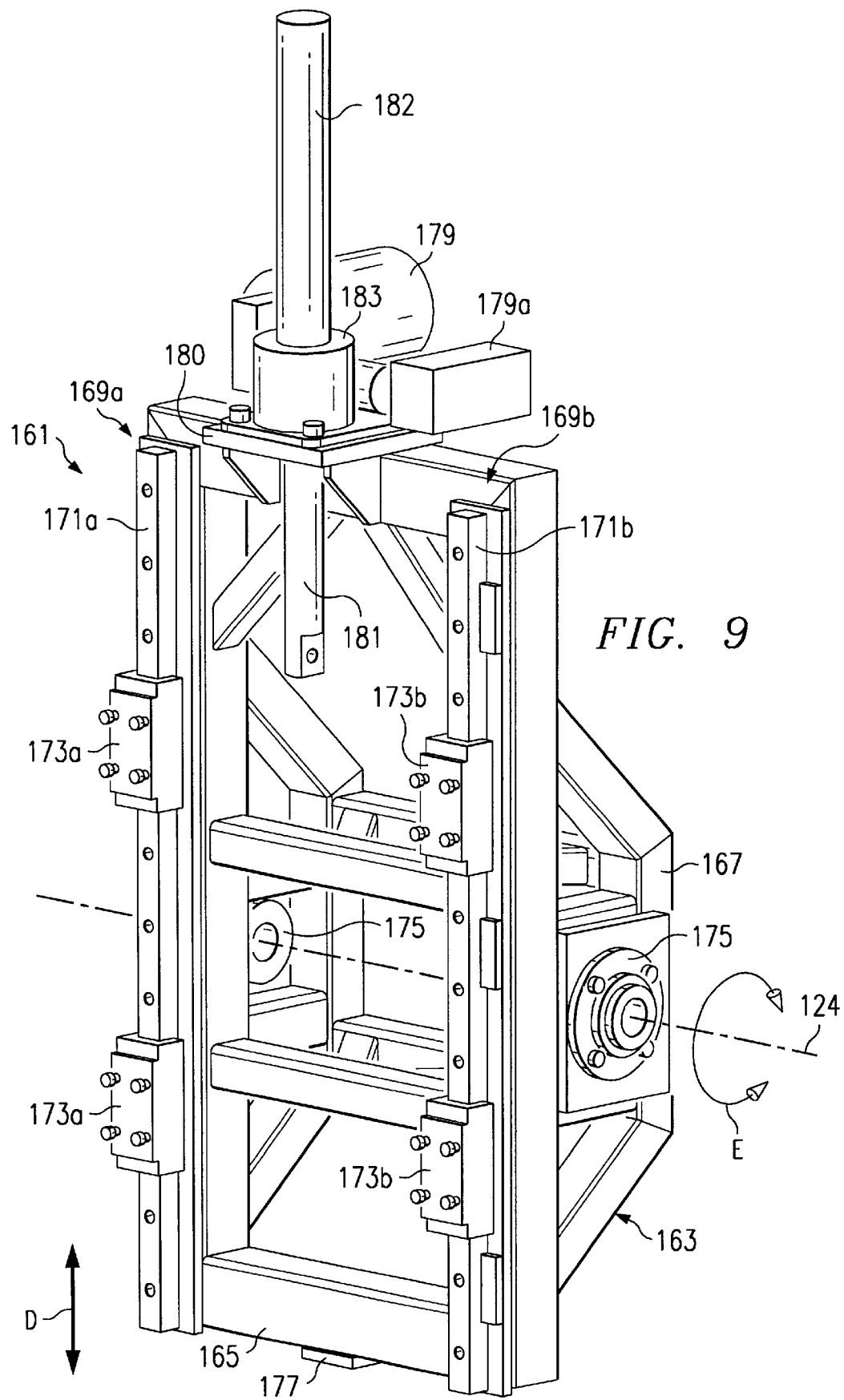
FIG. 9 is a front perspective view of a tilting component of the tool of FIG. 1A.

Referring now to FIG. 9 in the drawings, a tilting component 161 of base unit 13 is illustrated. Tilting component 161 is made of a strong, rigid material, such as iron or steel. Tilting component 161 includes a truss-type frame assembly 163 having a front frame 165 and a rear frame 167. A plurality of linear bearings 169a and 169b extend vertically along the length of front frame 165. Linear bearing 169a includes a rail portion 171a and a plurality of slide units 173a that slidingly mate with rail portion 171a. Likewise, linear bearing 169b includes a rail portion 171b and a plurality of slide units 173b that slidingly mate with rail portion 171b. A plurality of flange bearings 175 are coupled to frame assembly 163. Flange bearings 175 pivotally receive axle 126 of trunnion component 111, such that tilting component 161 pivots about axis 124. A mounting bracket 177 is coupled to the lower portion of front frame 165 to receive threaded shaft 147. As fourth motor 141 turns, threaded shaft 147 is either advanced or retracted. As threaded shaft 147 advances or retracts, tilting component 161 pivots upon axle 126 about axis 124. This rotation corresponds to second rotational degree of freedom E. In this manner, tilting component 161 rotates relative to trunnion component 111.

A fifth conventional electric motor 179 is coupled to frame assembly 163 at a mounting bracket 180. Fifth motor 179 actuates a threaded shaft 181. When retracted, threaded shaft 181 is protected by a shaft housing 182. In the preferred embodiment, fifth motor 179 includes a limit switch box 179a to limit the range of fifth motor 179 and the travel of threaded shaft 181. Threaded shaft 181 passes through a threaded housing member 183.

Figure 10:
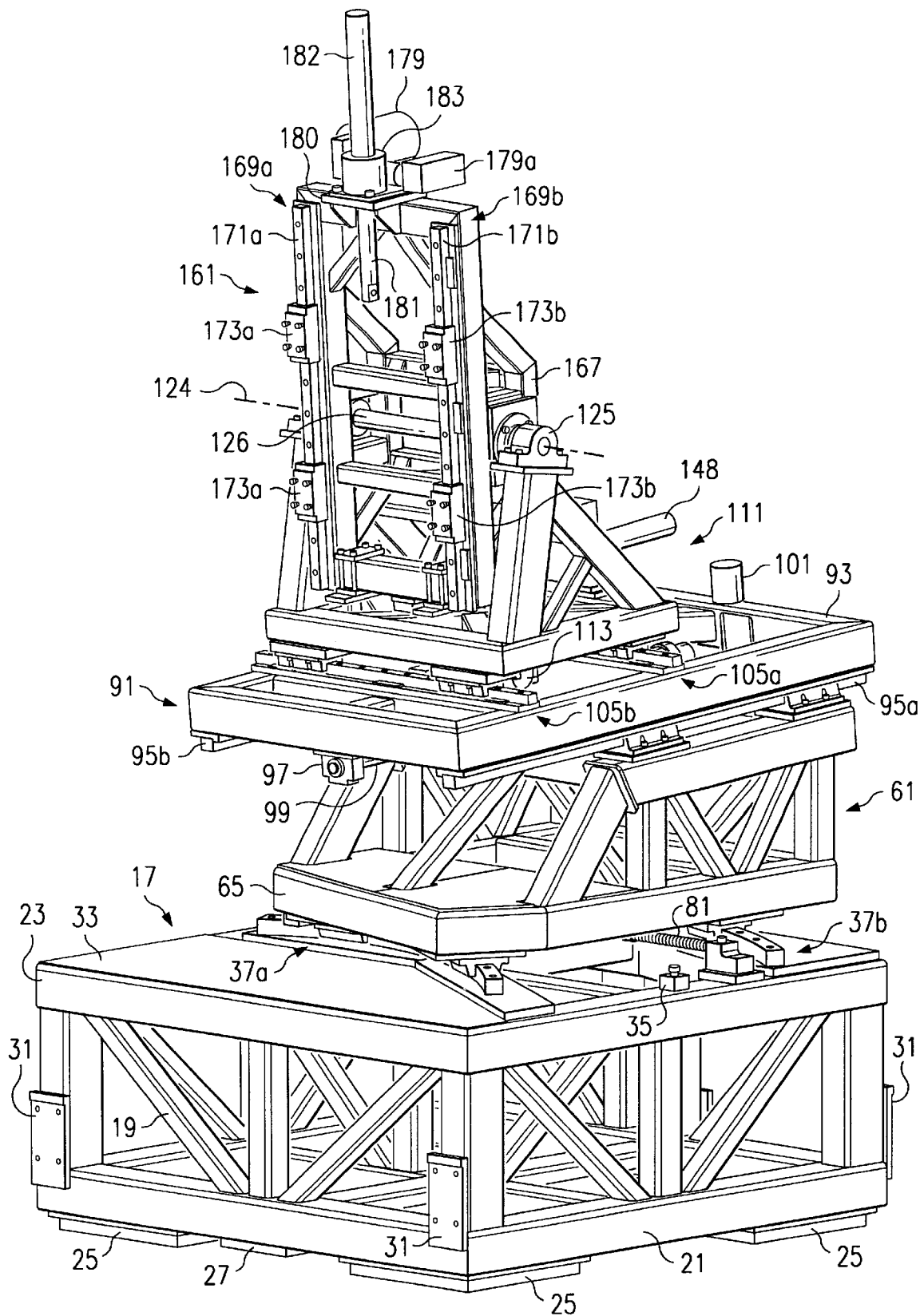
FIG. 10 is a front perspective view of the base support component of FIG. 2, the mid-level component of FIG. 3A, the upper plate component of FIG. 5A, the trunnion component of FIG. 7A, and the tilting component of FIG. 9 assembled together.

Referring now to FIG. 10 in the drawings, base support component 17, midlevel component 61, upper plate component 91, trunnion component 111, and tilting component 161 are illustrated assembled together in a front perspective view.

Figure 11A:
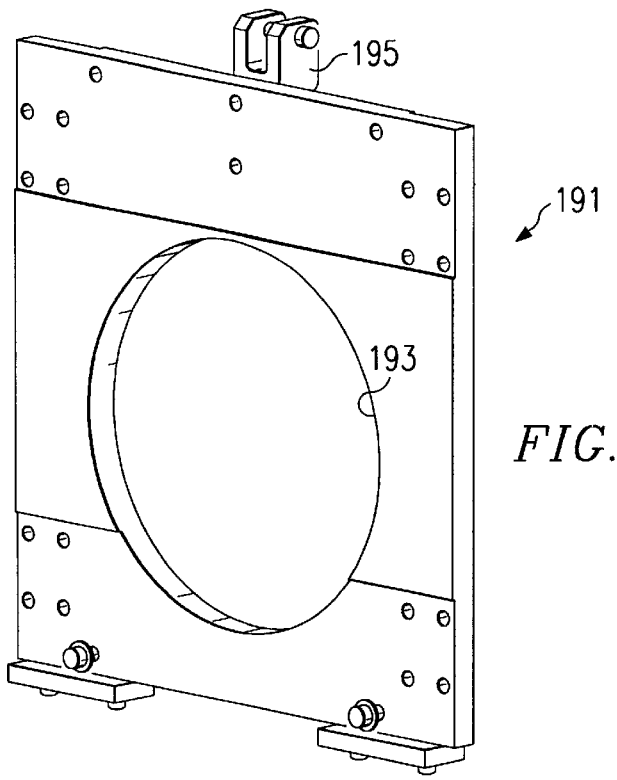
FIG. 11A is a front perspective view of a sliding plate component of the tool of FIG. 1A.
Figure 11B:
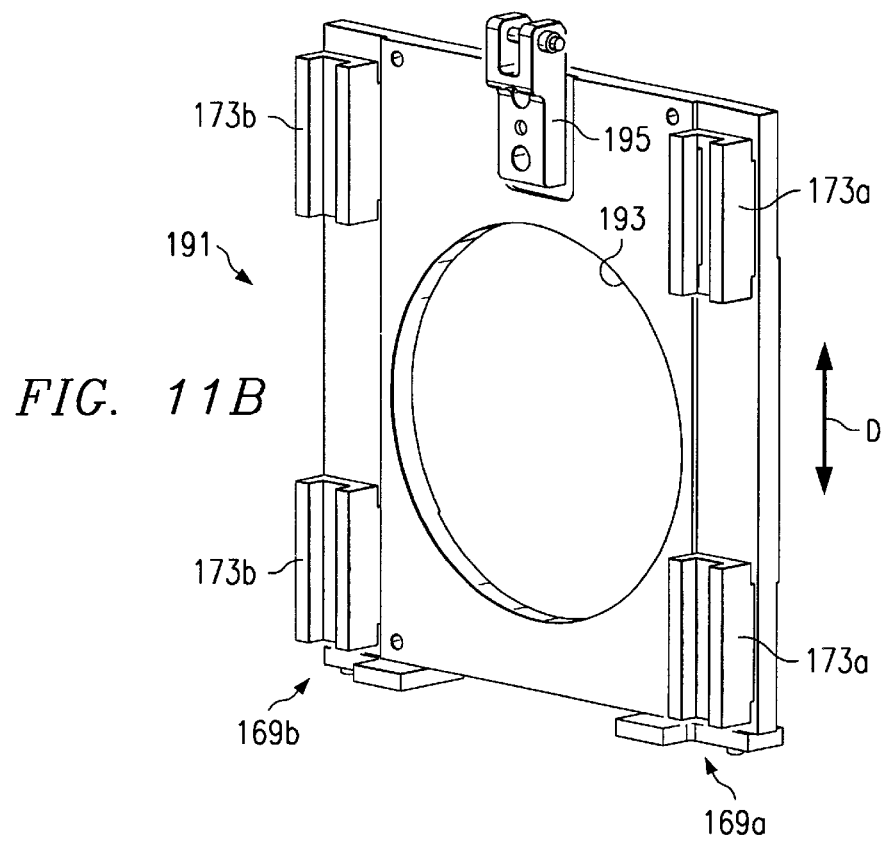
FIG. 11B is a rear perspective view of the sliding plate component of FIG. 11A.

Referring now to FIGS. 11A and 11B in the drawings, a sliding plate component 191 of base unit 13 is illustrated. Sliding plate component 191 is preferably made of a rigid, strong material, such as iron or steel. To aid in visibility while operating tool 11, sliding plate component 191 includes a relatively large aperture 193. A mounting bracket 195 is coupled to the upper portion of sliding plate component 191 to receive threaded shaft 181. As shown in FIG. 11B, slide units 173a and 173b are coupled to the rear face of sliding plate component 191. As fifth motor 179 turns, threaded shaft 181 is either raised or lowered. As threaded shaft 181 is raised or lowered, sliding plate component 191 translates relative to tilting component 161. This translation corresponds to third translational degree of freedom D. In this manner, sliding plate component 191 translates along linear bearings 169a and 169b relative to tilting component 161.

Figure 12:
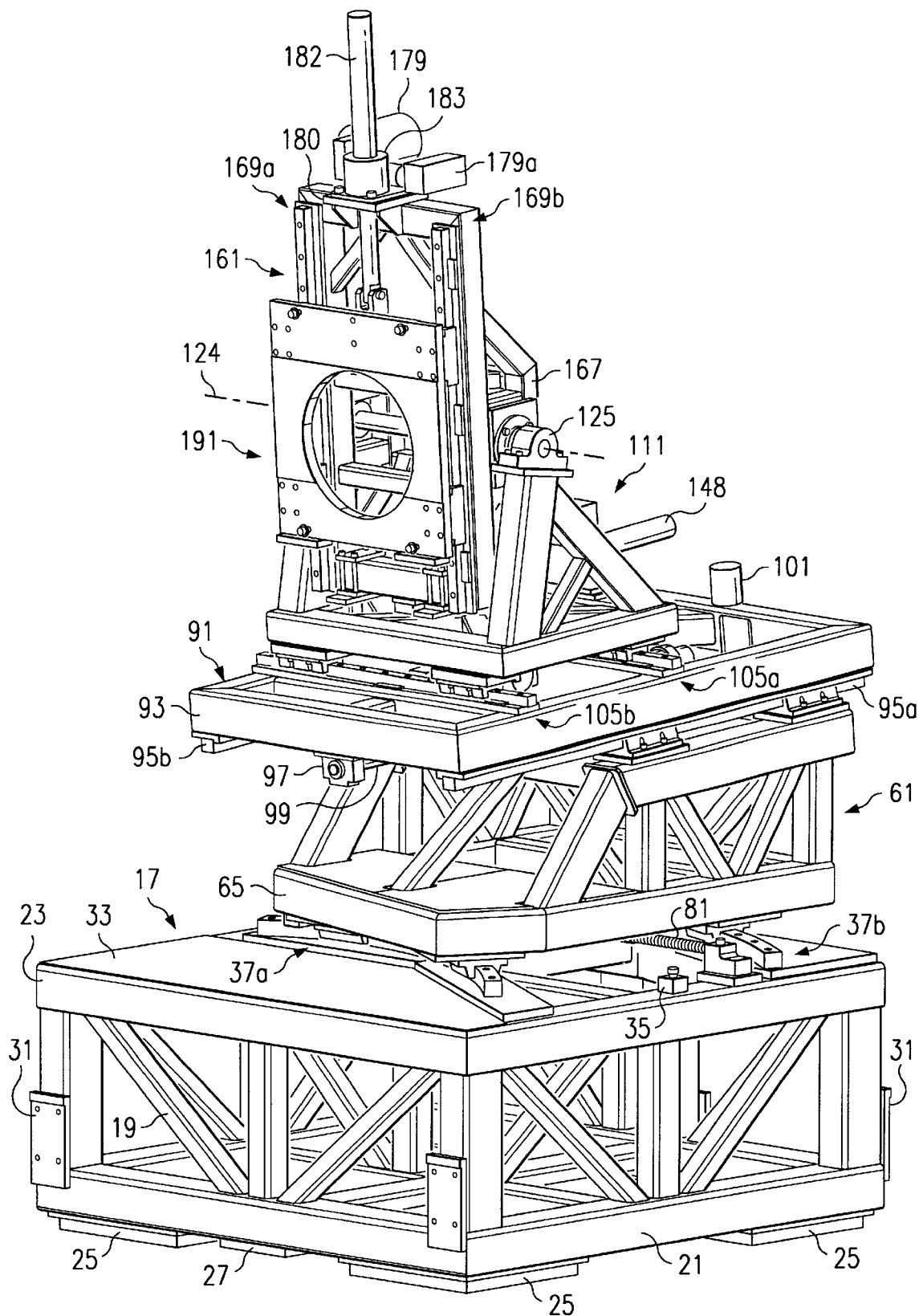
FIG. 12 is a front perspective view of the base support component of FIG. 2, the mid-level component of FIG. 3A, the upper plate component of FIG. 5A, the trunnion component of FIG. 7A, the tilting component of FIG. 9, and the sliding plate component of FIG. 11A assembled together.

Referring now to FIG. 12 in the drawings, base support component 17, midlevel component 61, upper plate component 91, trunnion component 111, tilting component 161, and sliding plate component 191 are illustrated assembled together in a front perspective view.

Figure 14:
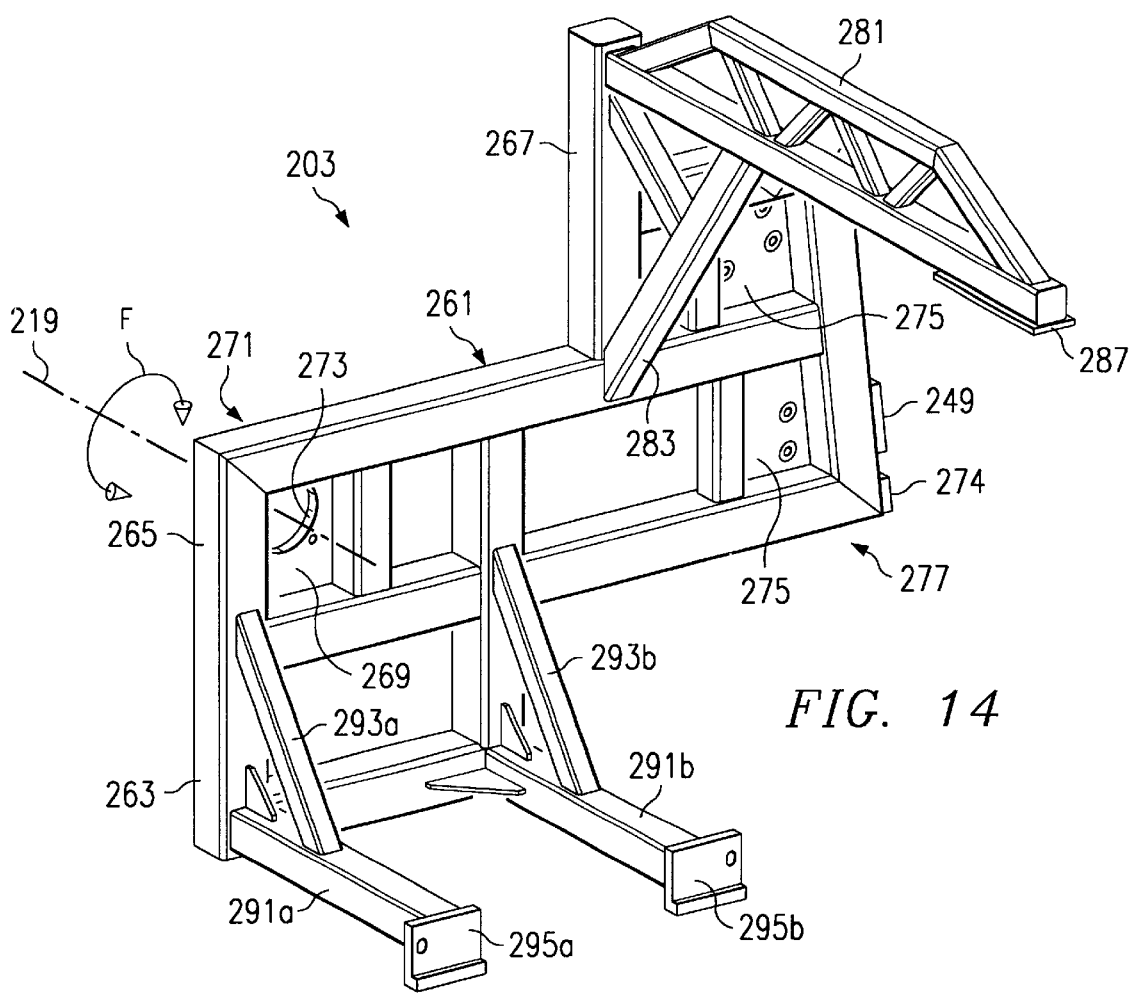
FIG. 14 is a front perspective view of a lift frame component of the left-hand, interchangeable unit of the tool of FIG. 1A.
Figure 15:
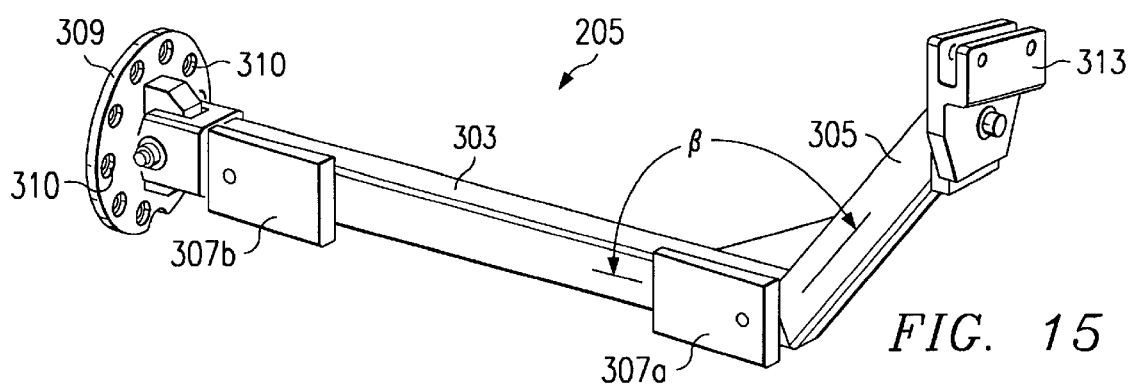
FIG. 15 is a rear perspective view of an engine arm component of the left-hand, interchangeable unit of the tool of FIG. 1A.
Figure 16:
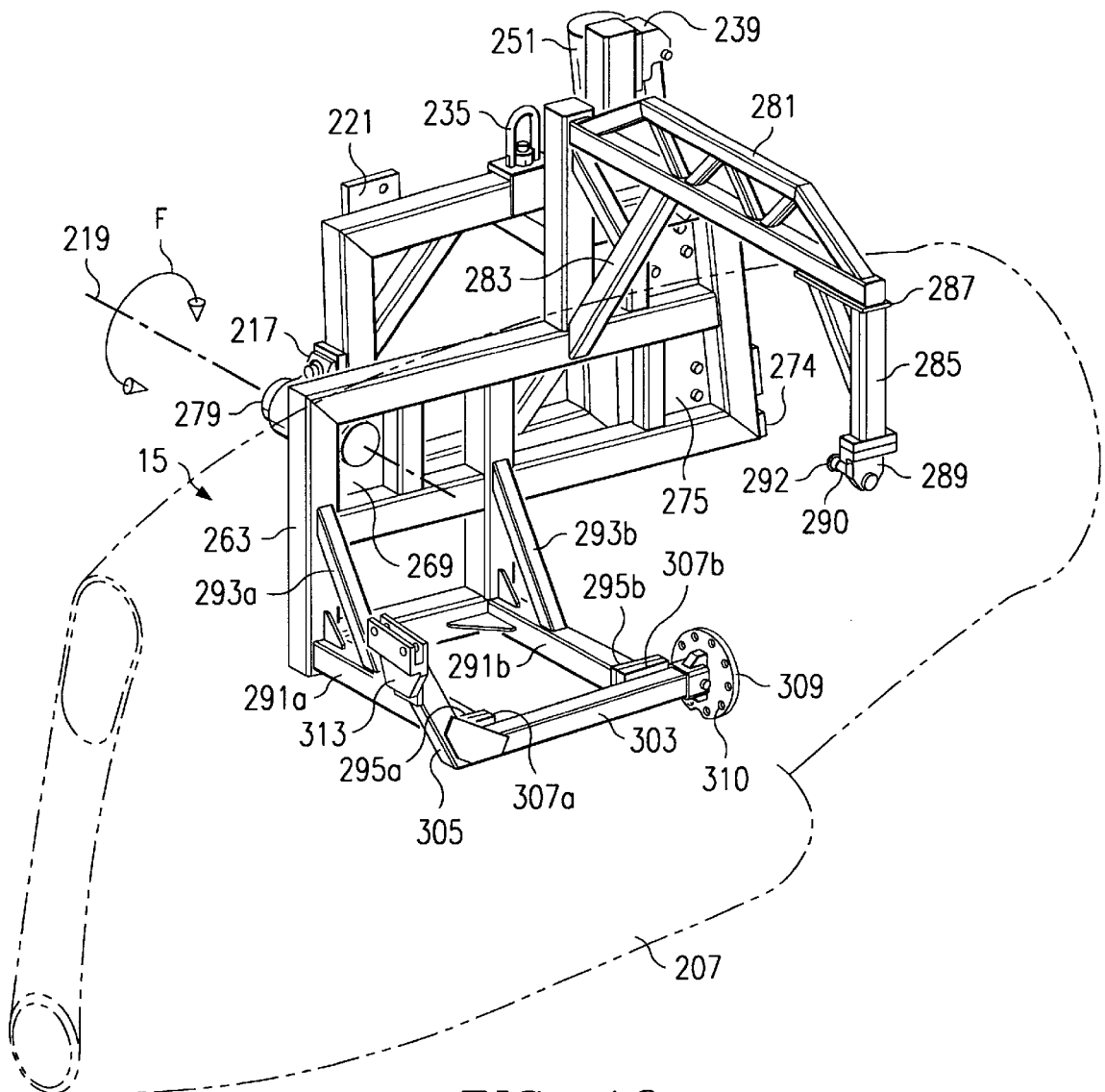
FIG. 16 is a front perspective view of the back plate component of FIG. 13, the lift frame component of FIG. 14, and the engine arm component of FIG. 15 assembled together to form the left-hand, interchangeable unit of the tool of FIG. 1A.

Referring now to FIGS. 13–16 in the drawings, interchangeable unit 15 is illustrated. In the preferred embodiment, interchangeable unit 15 is interchangeable between a left-hand interchangeable unit, as illustrated in FIGS. 13–16, and a right-hand interchangeable unit which is a mirror image of left-hand interchangeable unit 15, except for one component, as described below. The right-hand interchangeable unit functions identically as left-hand interchangeable unit 15. As such, only left-hand interchangeable unit 15 will be shown and discussed herein. Interchangeable unit 15 is stored on a storage stand (no shown) when not in use. It should be understood that interchangeable unit 15 may be interchangeable between a large number of interchangeable units, and such units need not be mirror images of each other, or even perform the same functions as each other. Interchangeable unit 15 includes multiple components: a back plate component 201 (see FIG. 13), a lift frame component 203 (see FIG. 14), and an engine arm component 205 (see FIG. 15). FIG. 16 is a front perspective view of back plate component 201, lift frame component 203, and engine arm component 205 assembled together. Because the preferred embodiment of the present invention involves the precision hoisting, alignment, and installation of tilt rotor nacelles onto the wings of a tilt rotor aircraft, a left-hand tilt rotor nacelle 207 is shown in phantom in FIG. 16.

Figure 13:
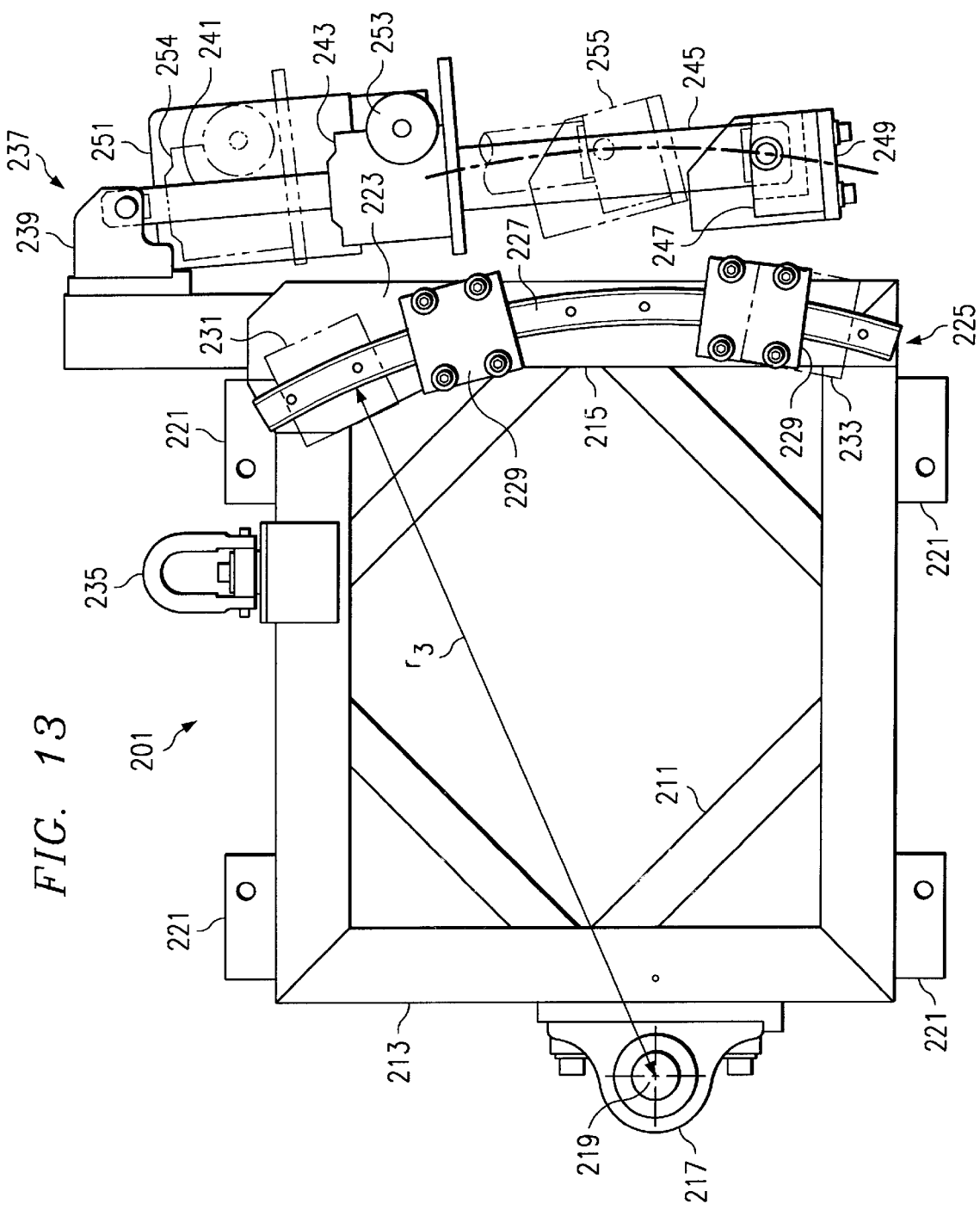
FIG. 13 is a front plan view of a back plate component of a left-hand, interchangeable unit of the tool of FIG. 1A.

Referring now specifically to FIG. 13 in the drawings, back plate component 201 of interchangeable unit 15 is illustrated. Back plate component 201 is preferably made of a rigid, strong material, such as iron or steel. Back plate component 201 includes a truss-type frame assembly 211 having an interior side 213 and an exterior side 215. A pillow block bearing 217 is coupled to frame assembly 211 at interior side 213. A plurality of attachment pads 221 are coupled to frame assembly 211. Attachment pads 221 allow back plate component 201 to be releasably coupled to sliding plate component 191. The releasable coupling between back plate component 201 of interchangeable unit 15 and sliding plate component 191 of base unit 13 provides the interchangeability feature of the present invention. It is at this interface that the left-hand and right-hand interchangeable units 15 are interchangeably coupled to base unit 13.

A plate member 223 is coupled to frame assembly 211 at exterior side 215. A curved bearing 225 is coupled to the front face of plate member 223. Curved bearing 225 includes a curved rail portion 227, having a radius of curvature $r_3$ about an axis 219, and a plurality of slide units 229 that slidingly mate with rail portion 227. Slide units 229 travel along rail portion 227 between a maximum raised position, indicated in phantom by reference numeral 231, and a maximum lowered position, indicated in phantom by reference numeral 233. A lift hook 235 is coupled to the top portion of frame assembly 211 to aid in lifting interchangeable unit 15 off of the storage stand when the left-hand interchangeable unit and the right-hand interchangeable unit are interchanged on tool 11.

A drive assembly 237 is coupled to the upper portion of external side 215 of frame assembly 211 at an upper mounting bracket 239. A threaded shaft 241 is pivotally coupled at one end to mounting bracket 239, extends through a threaded housing member 243, and passes into a shaft housing 245. Shaft housing 245 is pivotally coupled to a lower mounting bracket 247. Lower mounting bracket 247 is coupled to an attachment bracket 249. Attachment bracket 249 allows drive assembly 237 of back plate component 201 to be coupled to lift frame component 203. A sixth conventional electric motor 251 is coupled to threaded housing member 243. As sixth motor 251 turns, shaft housing 245, threaded housing member 243, and sixth motor 251 translate coaxially with threaded shaft 241 relative to upper mounting bracket 239. Threaded housing member 243 has a maximum raised position, indicated in phantom by reference numeral 254, and lower mounting bracket 247 and attachment bracket 249 have a maximum raised position, indicated in phantom by reference numeral 255. Due to limited space, sixth motor 251 does not include an external limit switch, which would be attached to sixth motor 251 at a shaft housing 253. Instead, the travel of shaft housing 245, threaded housing member 243, and sixth motor 251 is limited by mechanical collars (not shown) coupled to the top portion of threaded shaft 241 and within shaft housing 245.

Referring now specifically to FIG. 14 in the drawings, lift frame component 203 is illustrated. Lift frame component 203 is preferably made of a rigid, strong material, such as iron or steel. Lift frame component 203 includes a truss-type frame assembly 261 having a lower frame portion 263, a middle frame portion 265, and an upper frame portion 267. An attachment plate 269 is coupled to the rear face of an interior side 271 of lift frame component 203. Attachment plate 269 includes an aperture 273 that is coaxial with axis 219. A plurality of attachment plates 275 are coupled to the rear face of middle frame portion 265 at an exterior side 277 of lift frame component 203. Attachment plates 275 allow lift frame component 203 to be coupled to slide units 229. When attachment plates 275 are coupled to slide units 229, lift frame component 203 and back plate component 201 align such that aperture 273 in attachment plate 269 is aligned with pillow block bearing 217 along axis 219. Lift frame component 203 pivots about a pivot pin 279 (see FIG. 16) that is coaxial with axis 219 and pillow block bearing 217, and that extends through aperture 273 in attachment plate 269 of lift frame component 203. An attachment pad 274 is coupled to the exterior side face of exterior side 277 to facilitate coupling of drive assembly 237 of back plate component 201 to lift frame component 203.

An upper extension assembly 281 extends perpendicularly forward from upper frame portion 267. Upper extension assembly 281 is preferably a truss-type frame assembly having a support brace 283 and terminating with a downwardly extending nacelle attachment member 285 (see FIG. 16). Nacelle attachment member 285 is releasably coupled to upper extension assembly at an attachment pad 287. Nacelle attachment member 285 terminates with a coupling member 289 that is configured for coupling to a tilt rotor nacelle support 301 (see FIG. 17A). Coupling member 289 includes a conversion arm pin 290 and an attachment nut 292. Upper extension assembly 281, nacelle attachment member 285, and coupling member 289 are configured to extend over the top of nacelle 207, pass down in front of nacelle 207, and attach to nacelle support 301 of the tilt rotor engine (see FIG. 17A).

A plurality of lower extension arms 291a and 291b extend perpendicularly forward from lower frame portion 263. Lower extension arms 291 a and 291 b are supported by brace members 293a and 293b, respectively. Lower extension arms 291a and 291b terminate with attachment hooks 295a and 295b, respectively, which are configured for coupling to engine arm component 205.

Referring now specifically to FIG. 15 in the drawings, engine arm component 205 is illustrated in a rear perspective view. Engine arm component 205 is preferably made of a rigid, strong material, such as iron or steel. Engine arm component 205 includes a first elongated bar 303 and a second elongated bar 305. First and second elongated bars 303 and 305 form a selected angle β. A plurality of attachment pads 307a and 307b are coupled to bars 303 and 305. Attachment pads 307a and 307b are configured and located to align with attachment hooks 295a and 295b to facilitate the releasable coupling of engine arm component 205 to lift frame component 203. First elongated bar 303 terminates with a coupling flange 309. Coupling flange 309 includes a plurality of mounting apertures 310 and is configured to align with and be releasably coupled to a prop rotor gear box 311 (see FIG. 25B) of the left-hand tilt rotor engine. Second elongated bar 305 terminates with an engine mount coupling 313. Engine mount coupling 313 is generally transverse to second elongated bar 305, and is configured to be releasably coupled to an engine mount 315 (see FIG. 25B) disposed within nacelle 207.

Although left-hand back plate component 201 and right-hand back plate component (not shown) are mirror images of each other; and left-hand lift frame component 203 and the right-hand lift frame component (not shown) are mirror images of each other; left-hand engine arm component 205 and the right-hand engine arm component (not shown) are not exact mirror images of each other. When assembled with lift frame component 203, engine arm component 205 is located within nacelle 207 where the tilt rotor engine (not shown) would be located. Because the engines in a tilt rotor aircraft are typically counter-rotating, the right-hand engine is not installed in exactly the same position as the left-hand engine. For this reason, right-hand engine arm has a slightly different configuration and height of attachment pads 307a and 307b than left-hand engine arm 205; however, the function of left-hand engine arm component 205 and the right-hand engine arm component are identical.

Referring now specifically to FIG. 16 in the drawings, interchangeable unit 15 is illustrated with nacelle 207 shown in phantom. Back plate component 201, lift frame component 203, and engine arm component 205 are shown assembled together. When sixth motor 251 is activated, frame component 203 rotates along curved bearing 225 about pivot pin 279 and axis 219 relative to back plate component 201. This rotation about axis 219 creates third rotational degree of freedom F.

Figure 17A:
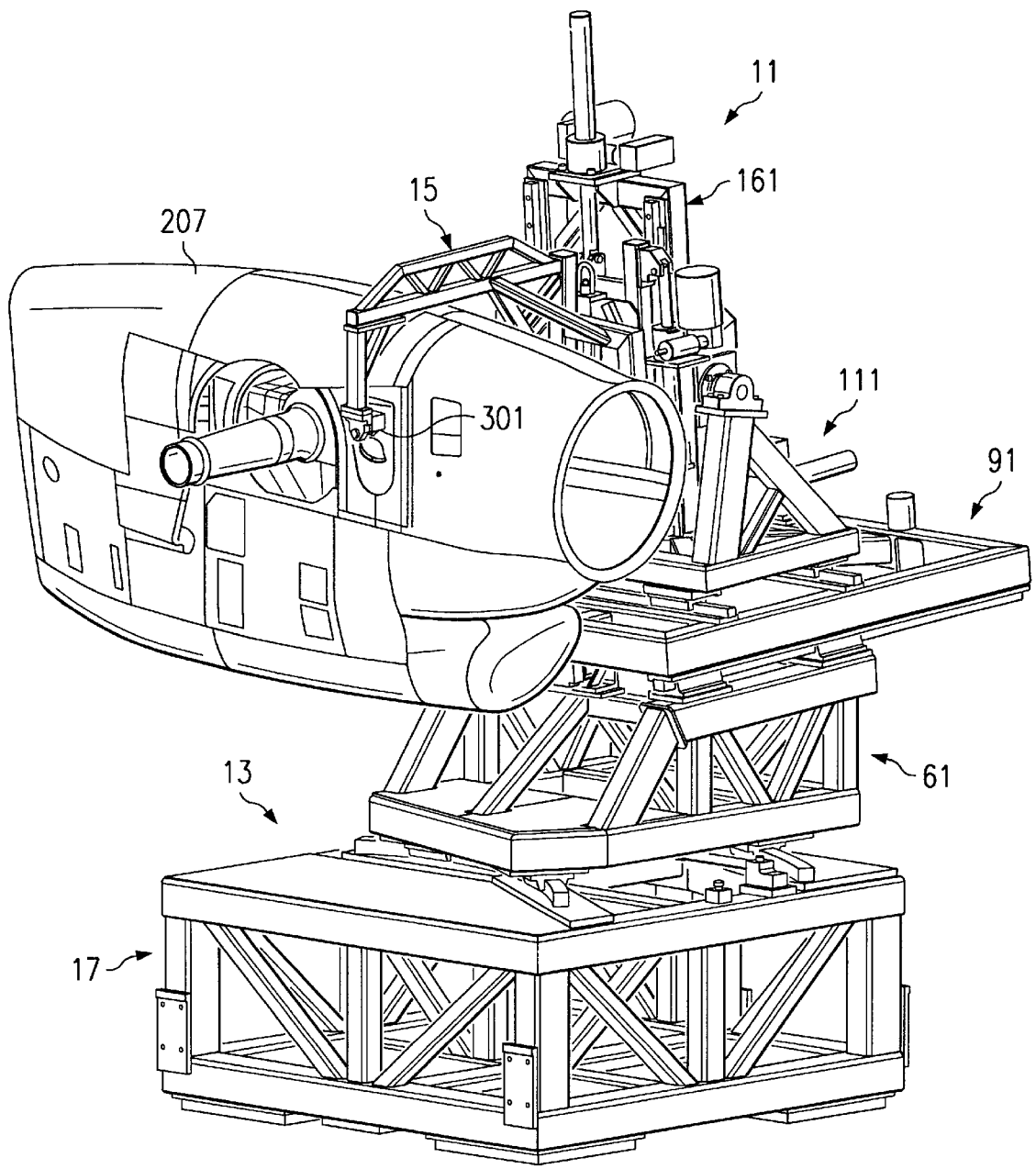
FIG. 17A is a front perspective view of the tool of FIG. 1A in a retracted mode and coupled to a left-hand nacelle support housing of a left-hand tilt rotor aircraft engine.
Figure 17B:
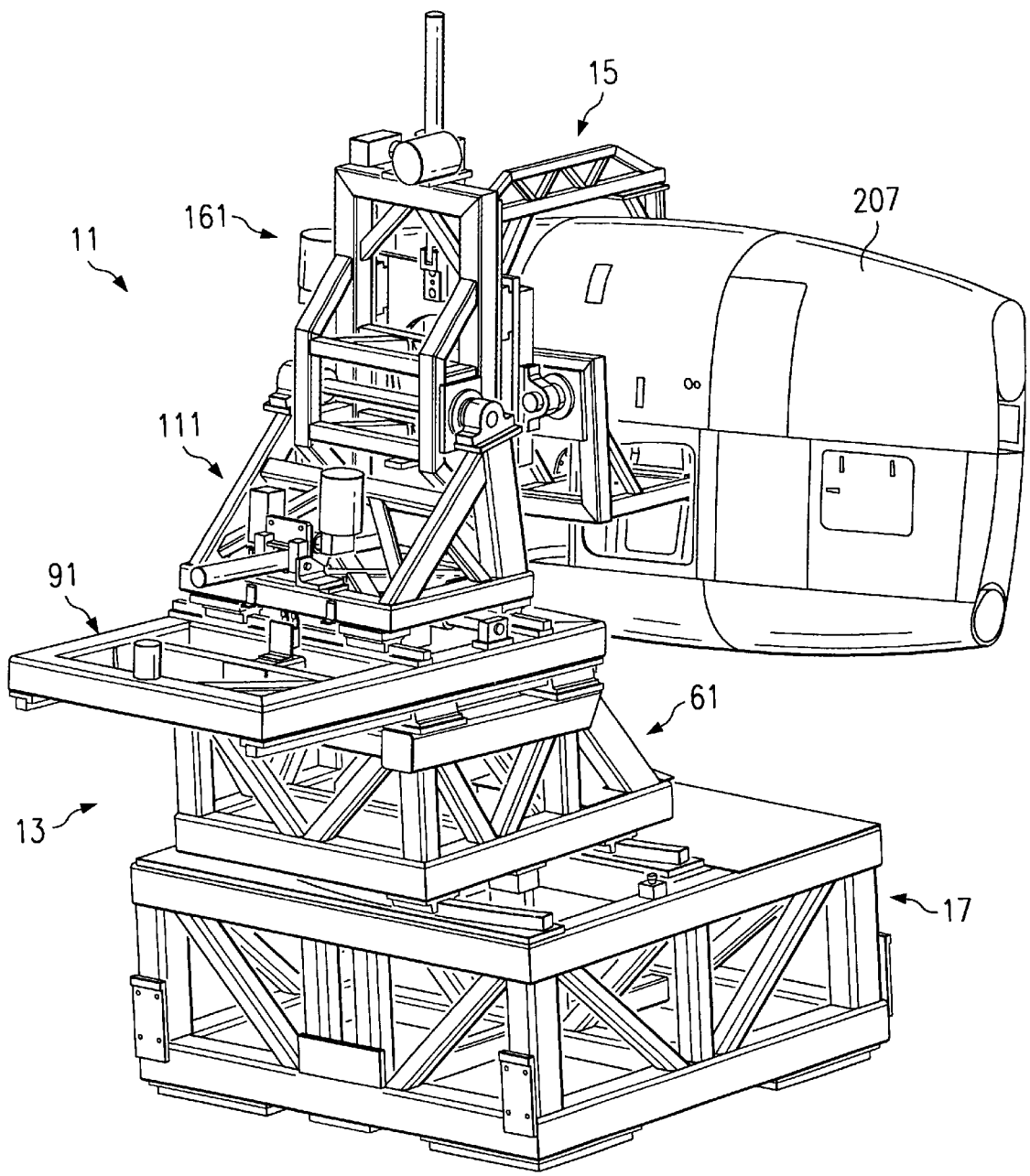
FIG. 17B is a rear perspective view of the tool of FIG. 1A in the retracted mode of FIG. 17A.

Referring now to FIGS. 17A–17D in the drawings, tool 11 of the present invention is illustrated in front and rear perspective views which show tool 11 in an "extended" mode and a "retracted" mode. FIG. 17A is a front perspective view of tool 11 in the fully retracted position, and FIG. 17B is a rear perspective view of tool 11 in the fully retracted position. In the fully retracted position, upper plate component 91 is translated as far back as the control system will allow relative to mid-level support component 61. After nacelle 207 has been coupled to tool 11, as described below, installation of nacelle 207 onto the wing of the tilt rotor aircraft typically begins with tool 11 in this retracted position. One reason for this is to locate the center of gravity of tool 11 and nacelle 207 as close over the center of base support component 17 as possible, for maximum stability while being moved to the location where nacelle 207 will be mated with the wing.

Figure 17C:
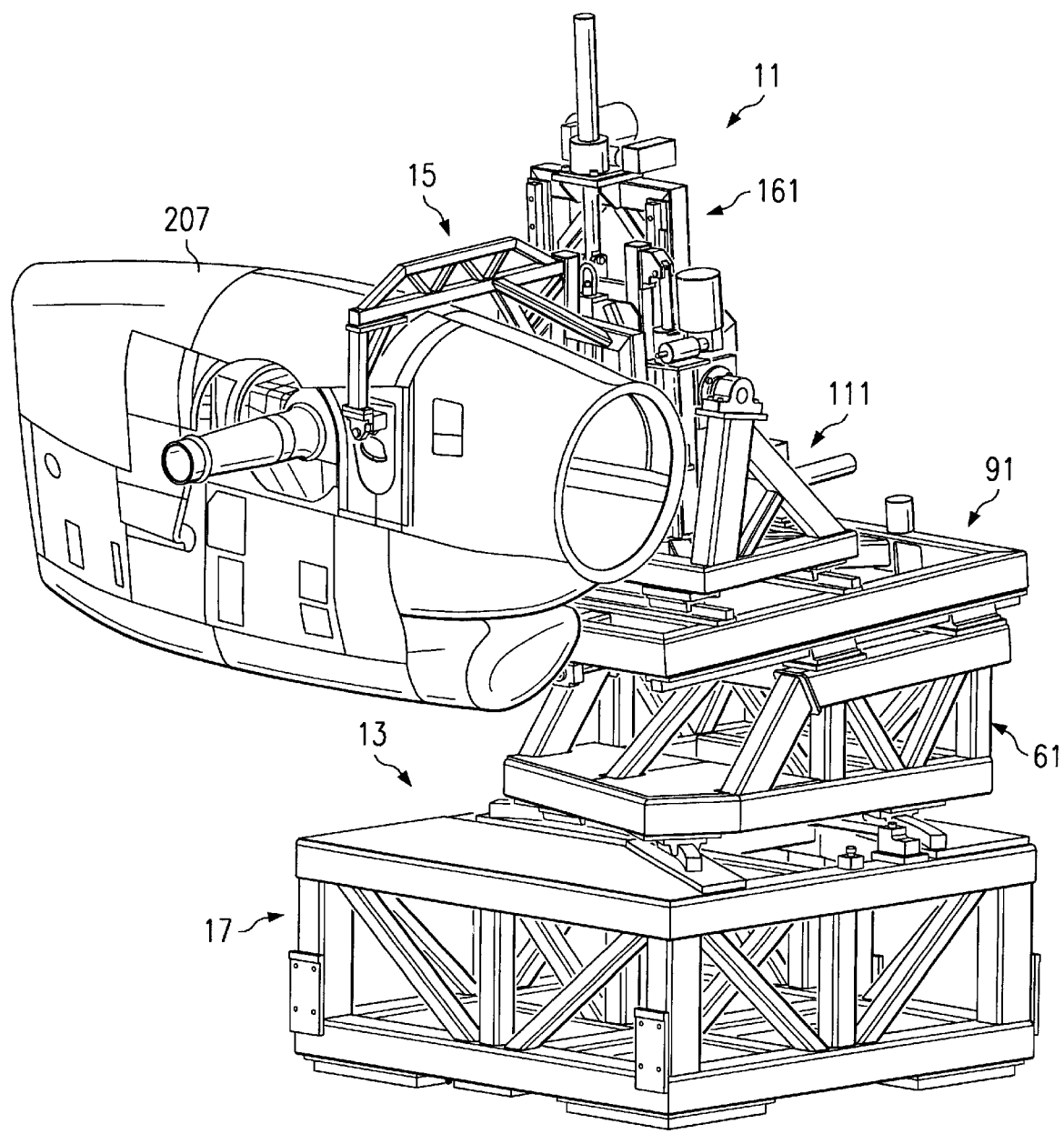
FIG. 17C is a front perspective view of the tool of FIG. 1A in an extended mode and coupled to the left-hand nacelle support housing of the left-hand tilt rotor aircraft engine.
Figure 17D:
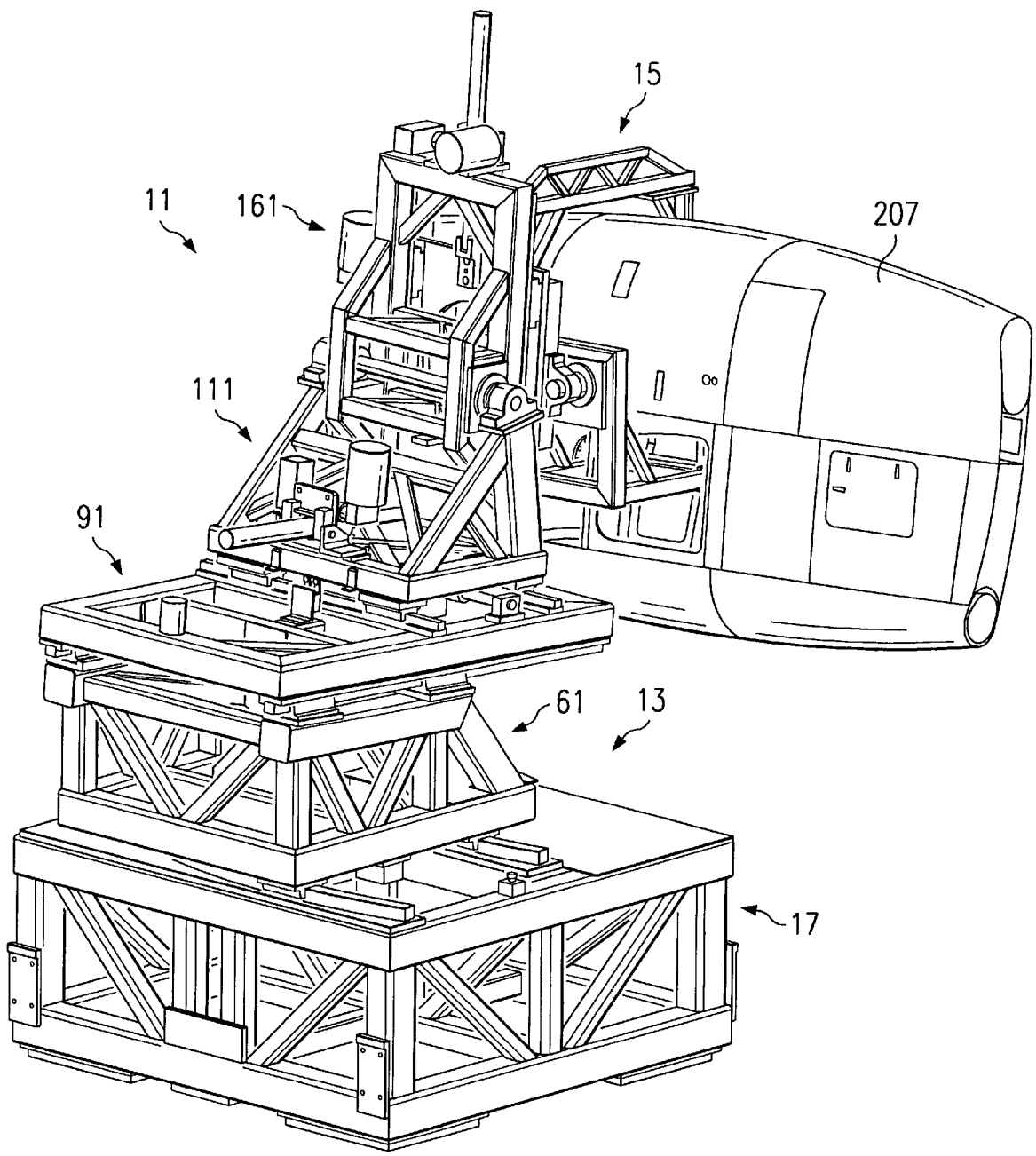
FIG. 17D is a rear perspective view of the tool of FIG. 1A in the extended mode of FIG. 17C.

FIG. 17C is a front perspective view of tool 11 in the fully extended position, and FIG. 17D is a rear perspective view of tool 11 in the fully extended position. In the fully extended position, upper plate component 91 is translated as far forward as the control system will allow relative to mid-level support component 61. Tool 11 moves from the retracted position toward the extended position, as well as other movements in the other five degrees of freedom, as nacelle 207 is being installed into the wing of the tilt rotor aircraft.

Referring now to FIGS. 18 and 19 in the drawings, two separate modes of transportation of tool 11 are illustrated. FIG. 18 is a bottom perspective view of tool 11 which provides a clear view of a first mode of transportation: a levitation mode. In the levitation mode, air bearings 25 produce a cushion of compressed air which levitates tool 11 off of the ground, provided the ground is relatively smooth and flat. Air bearings 25 include doughnut-shaped bladders 351 through which the compressed air is directed toward the ground in a controlled air flow. When air bearings 25 are not in operation, tool 11 rests on the ground on a plurality of support pads 353 located in the center of bladders 351.

FIG. 19 is a left-side view of tool 11 which provides a view of a second mode of transportation: a rolling mode. The rolling mode of transportation is used when tool 11 must be transported across a ground surface that is not flat or smooth enough for operation in the levitation mode, such as across a tarmac or an airport runway. The rolling mode of transportation is accomplished by attaching casters 29 to caster attachment pads 31 of base support unit 17. Casters 29 allow entire tool 11 to be manually moved and turned from one location to another.

Figure 20A:
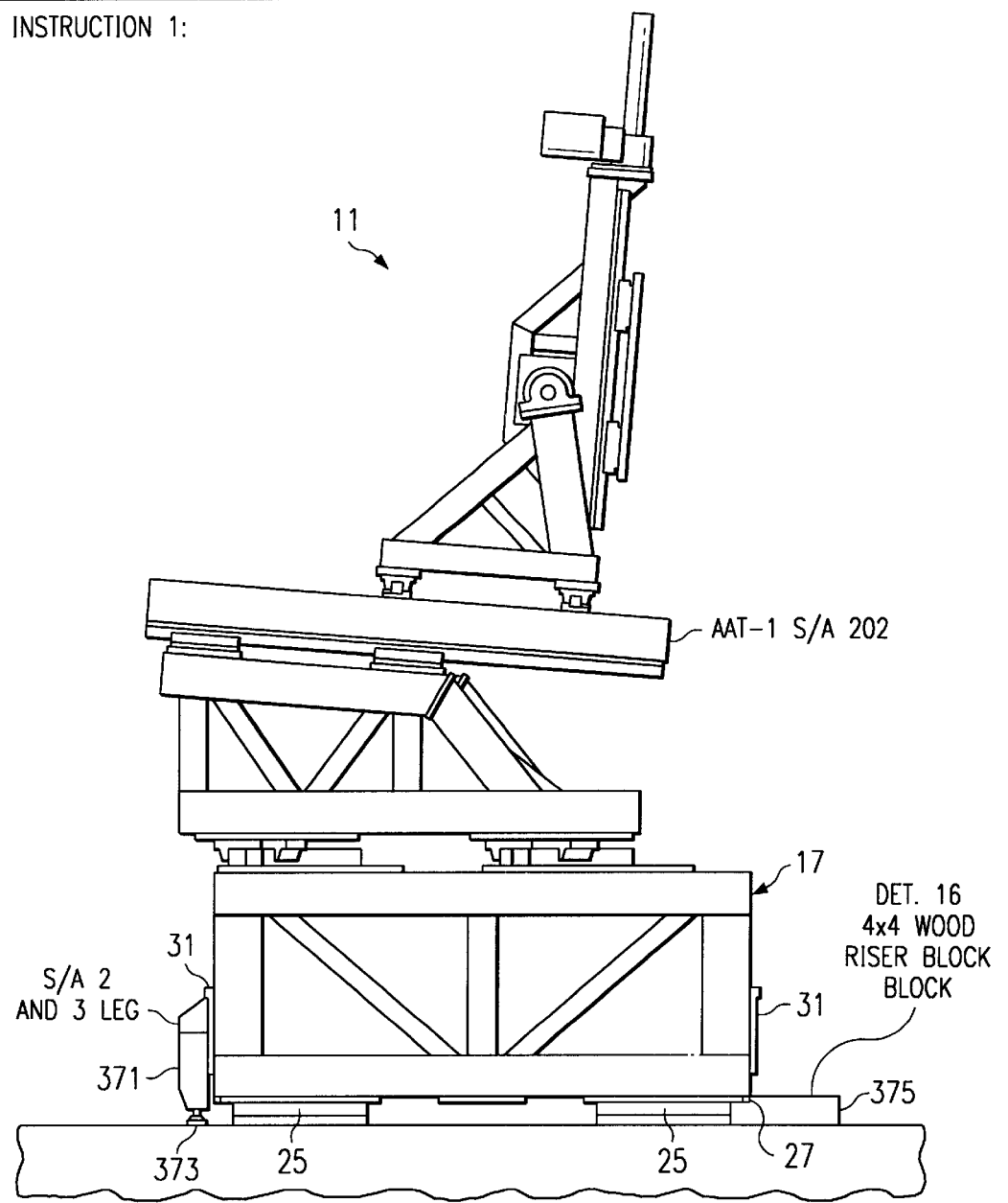
FIGS. 20A–20E are left side views of the tool of FIG. 1A illustrating a procedure for transitioning the tool of FIG. 1A from a levitation mode of transportation to a rolling mode of transportation.
Figure 20B:
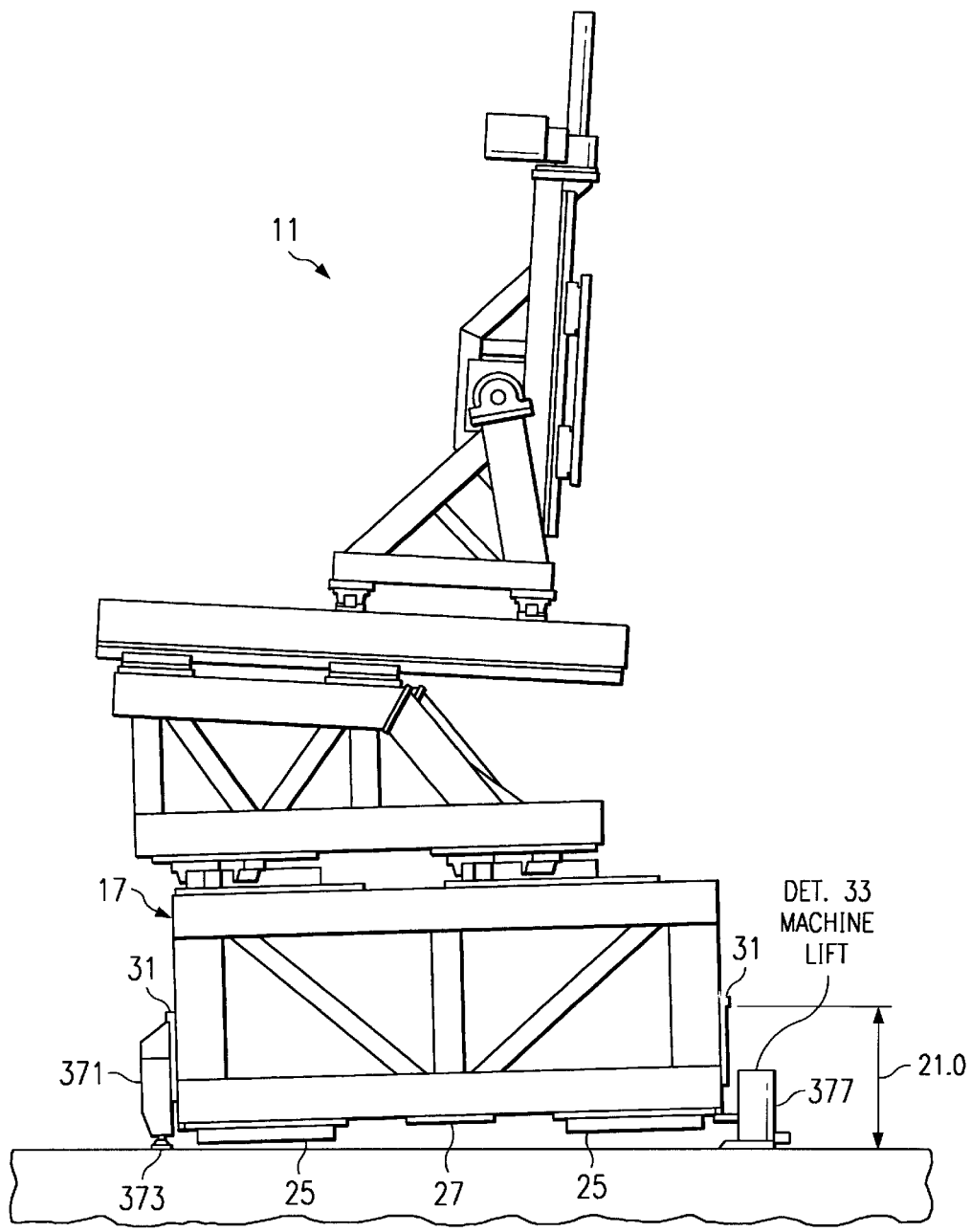
Figure 20C:
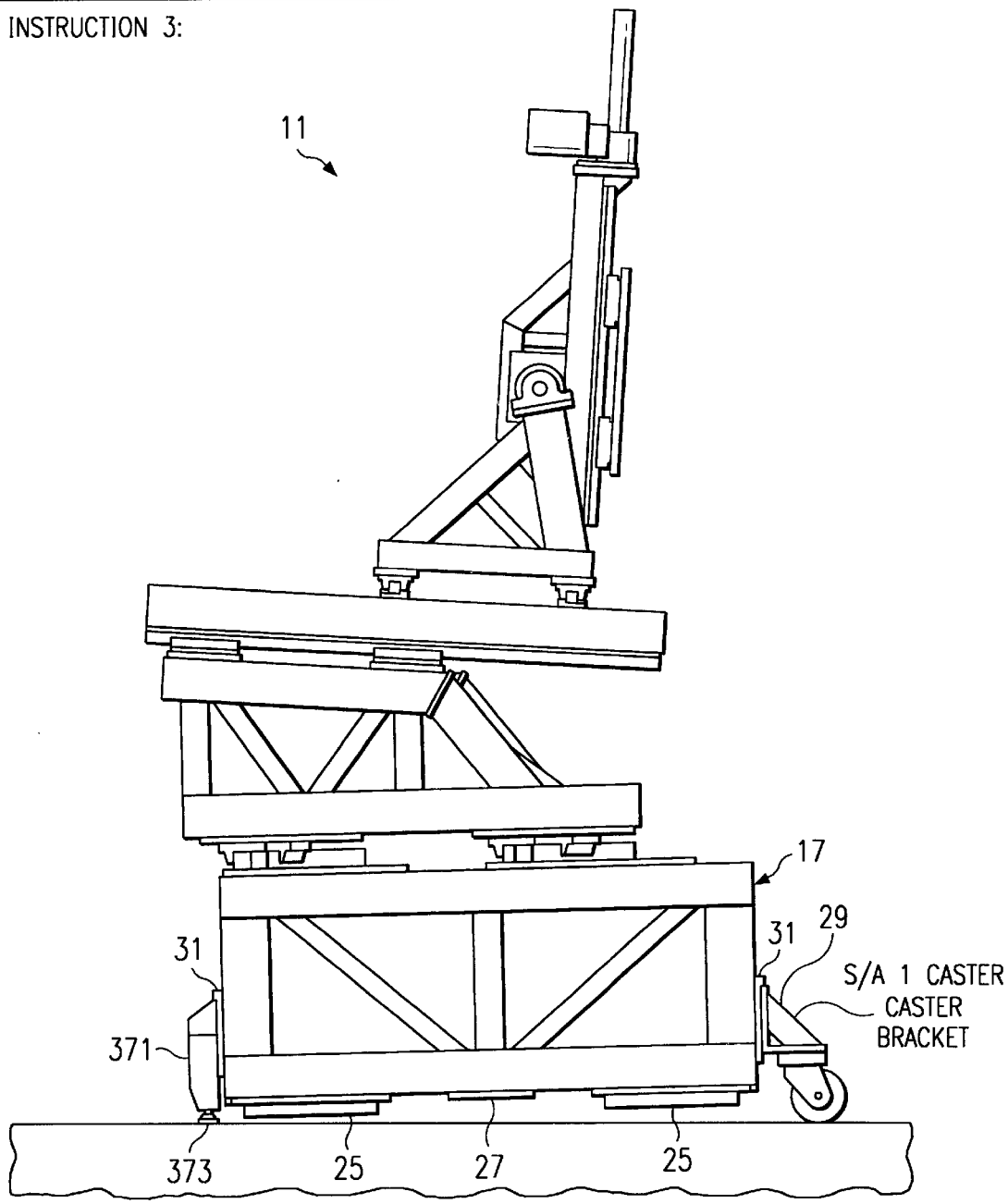
Figure 20D:
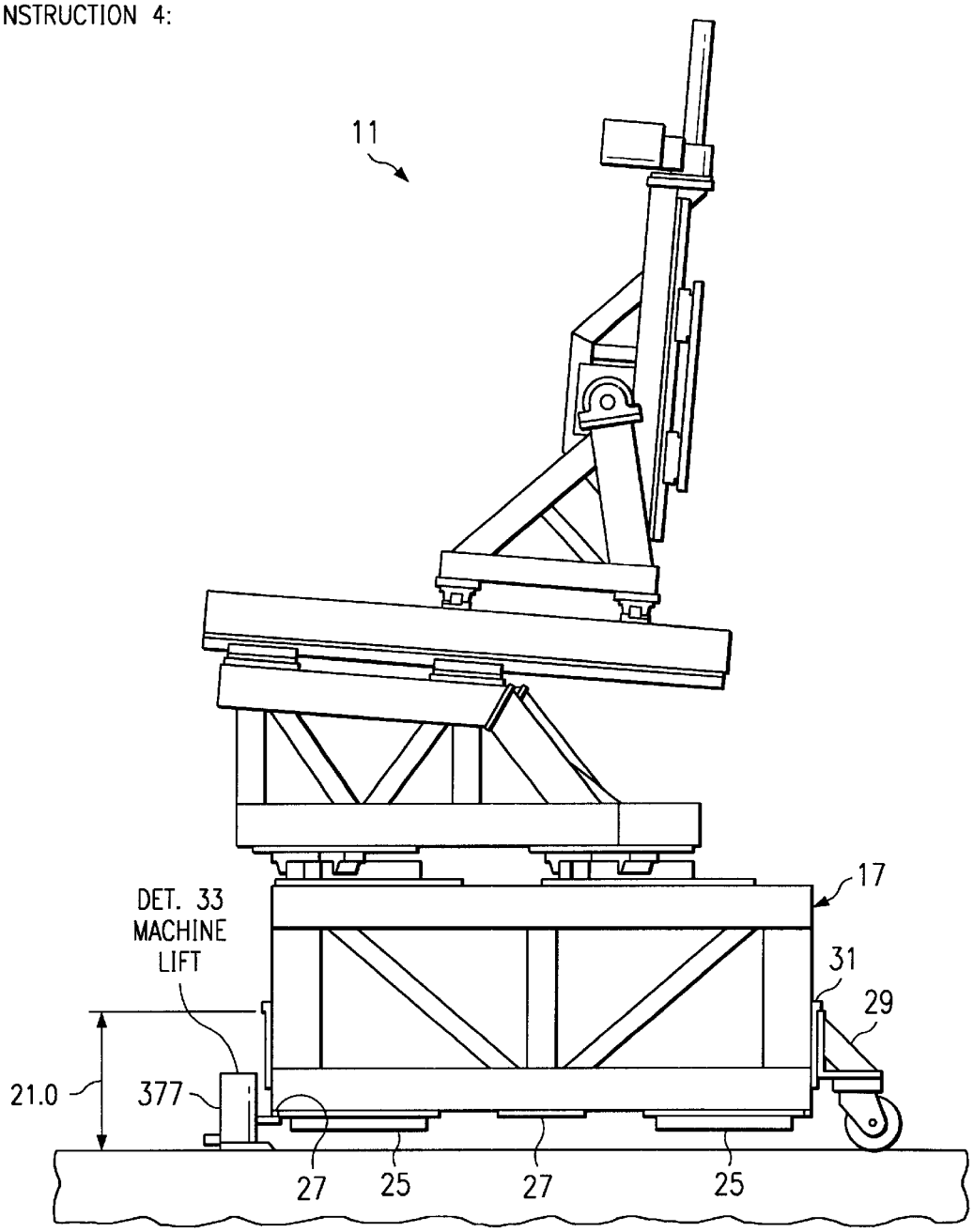
Figure 20E:
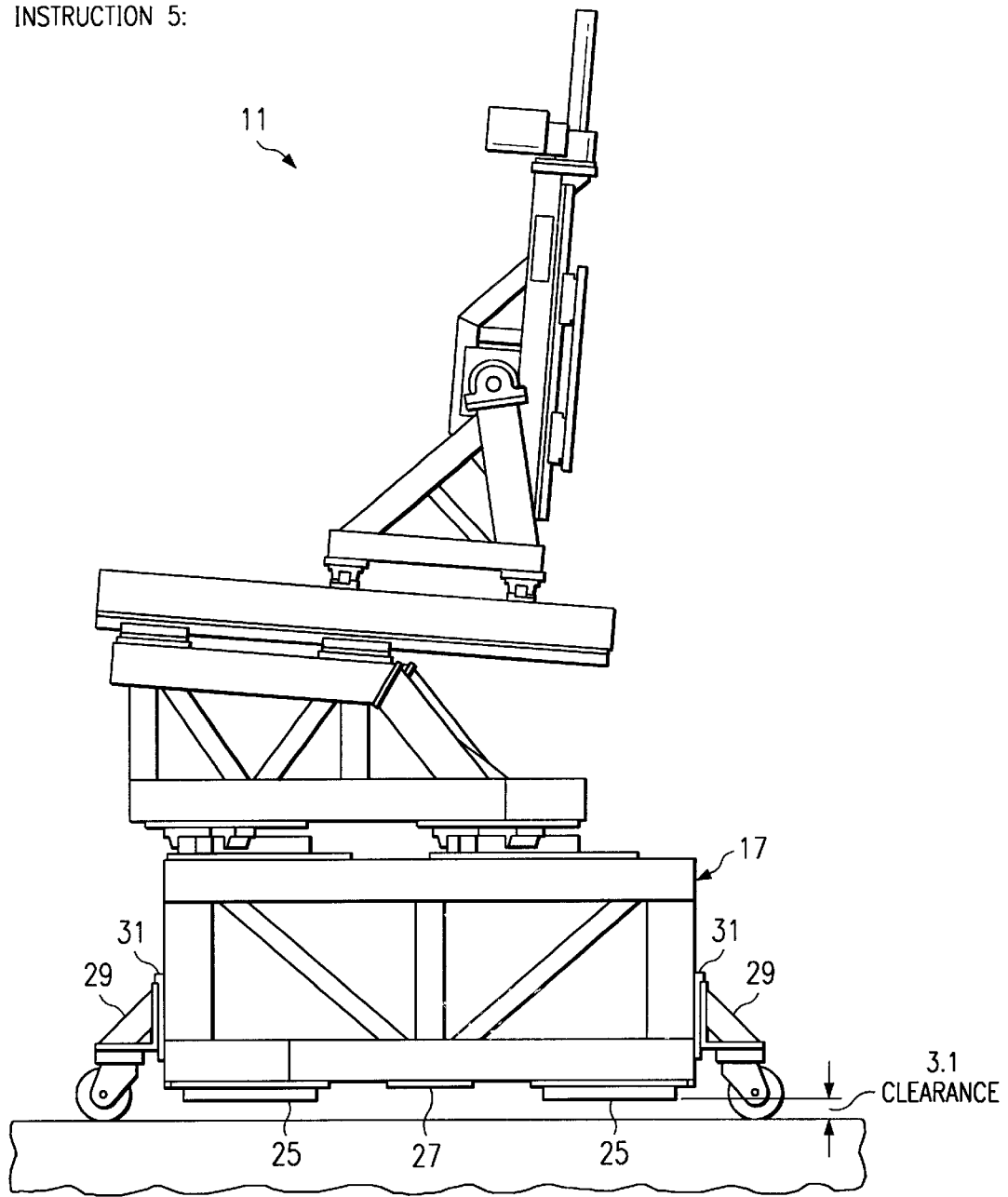

Referring now to FIGS. 20A–20E in the drawings, the preferred method of transitioning tool 11 from the levitation mode of transportation to the rolling mode of transportation is illustrated. The transition steps are as follows:
1. Position tool 11 as shown in FIG. 20A.
2. Turn on air bearings 25 to lift tool 11.
3. Attach a plurality of attachment legs 371 to tool 11 at caster attachment pads 31.
4. Adjust swivel feet 373 down to within 0.25 inches of the ground.
5. Slide a plurality of riser blocks 375 under tool 11 on the side opposite the side of tool 11 on which attachment legs are attached.
6. Riser blocks 375 are preferably made of four inch by four inch wood posts, and should be placed on each side of jack pad 27.
7. Turn off air bearings 25 allowing tool 11 to rest on attachment legs 371 and riser blocks 375.
8. Place conventional jack 377 under jack pad 27.
9. Raise tool 11 with jack 377 until the top of caster attachment pad 31 is approximately twenty-one inches above the ground.
10. Attach casters 29.
11. Lower tool 11 onto casters 29.
12. Chock casters in place to prevent tool 11 from moving.
13. Remove riser blocks 375.
14. Remove jack 27.
15. Position jack 377 under lift pad 27 on the opposite side of tool 11.
16. Raise tool 11 such that the top of caster attachment pad 31 is approximately twenty-one inches above the ground.
17. Place riser blocks 375 under tool 11 on both sides of jack pad 27.
18. Remove attachment legs 371.
19. Attach caster brackets 29 to caster attachment pads 31.
20. Lower tool 11 onto casters 29.
21. Remove riser blocks 375.
22. Remove jack 377.
23. Chock casters 29 securely in place.

This procedure should place tool 11 on four casters 29 such that a clearance of approximately 3.1 inches exists between the ground and the lower portion of air bearings 25. Thus assembled, tool 11 may be manually moved by rolling on casters 29. This rolling mode of operation is particularly useful when tool 11 must be moved out of a controlled environment, where the ground is relatively smooth and flat, into an environment where the ground is rough and/or inclined, such as an airport runway or tarmac. It is also possible to move tool 11 in the rolling mode from one location to another, such as from one assembly plant to another. It is preferred that tool 11 be placed in the fully extended position so that the center of gravity of tool 11 is over the center of base support component 17.

Referring now to FIG. 21 in the drawings, a control pendant 401 for controlling tool 11 is illustrated. Control pendant 401 includes a plurality of buttons 403a, 403b, 405a, 405b, 407a, 407b, 409a, 409b, 411a, 411b, 413a, and 413b. Buttons 403a and 403b operate first motor 79 and cause mid-level component to pivot relative to base support component 17 about axis 43. This rotation corresponds with first rotational degree of freedom A about axis 43. Buttons 405a and 405b operate fourth motor 141 causing tilting component 161 to tilt forward and backward about axis 124. This rotation corresponds to second rotational degree of freedom E. Buttons 407a and 407b operate sixth motor 251 and cause lift frame component 203 to pivot about axis 219. This rotation corresponds to third rotational degree of freedom F. Buttons 409a and 409b operate fifth motor 179 causing sliding plate component 191 to translate up and down relative to tilting component 161. This translational motion corresponds to third translational degree of freedom D. Buttons 411a and 411b control third motor 113 and cause trunnion component 111 to translate to the right and left relative to upper plate component 91. This translational motion corresponds to second translational degree of freedom C. Buttons 413a and 413b control third motor 113 and cause upper plate component 91 to translate forward and backward relative to mid-level component 61. This translational motion corresponds to first translational degree of freedom B.

In the preferred embodiment, tool 11 and control pendant 401 are color coded to provide ease of operation of tool 11. For example, buttons 403a and 403b on control pendant 401 are colored white, and white visual indicia, such as a strip of white tape, is placed on tool 11 near curved bearings 37a and 37b to provide a clear indication to the operator that depression of buttons 403a and 403b causes tool 11 to pivot along curved bearings 37a and 37b. Buttons 405a and 405b are colored black, and black visual indicia, such as a strip of black tape, is placed on tool 11 near axis 124 to provide a clear indication to the operator that depression of buttons 405a and 405b causes tilting component 161 to tilt about axis 124. Buttons 407a and 407b are colored green, and green indicia, such as a strip of green tape, is placed on tool 11 near axis 129 to provide a clear indication to the operator that depression of buttons 407a and 407b causes lift frame component 203 to rotate about axis 219. Buttons 409a and 409b are colored red, and red visual indicia, such as a strip of red tape, is placed on tool 11 near tilting component 161 to provide a clear indication to the operator that depression of buttons 409a and 409b causes sliding plate component 191 to move up and down. Buttons 411a and 411b are colored yellow, and yellow visual indicia, such as a strip of yellow tape, is placed on tool 11 near the front face of upper plate component 91 to provide a clear indication to the operator that depression of buttons 411a and 411b causes trunnion component 119 to move to the right and left. Buttons 413a and 413b are colored blue, and blue visual indicia, such as a strip of blue tape, is placed on tool 11 near the top of mid-level component 61 to provide a clear indication to the operator that depression of buttons 413a and 413b causes upper plate component 91 to move in the forward and reverse direction.

In the preferred embodiment, first motor 79, second motor 98, third motor 113, fourth motor 141, fifth motor 179, and sixth motor 251 are configured to precisely move the corresponding components of tool 11 very slowly. Additionally, motors 79, 98, 113, 141, and 179, are limited internally, such as by limit switch boxes, externally, such as by external limit switches 115, or mechanically, such as by mechanical collars. These limiting means cause motors 79, 98, 113, 141, 179 and 251 to shut down and prevent travel of the corresponding components beyond predetermined limits. Motors 79, 98, 113, 141, 179 and 251; bearings 37a, 37b, 75a, 75b, 105a, 105b, 169a, and 169b; and threaded shafts and ball screws, 81, 99, 100, and 181 allow tool 11 to be positionally controlled down to a clearance of about 0.005 inches between a nacelle spindle 507 (see FIG. 25F) and a tip-rib bearing 513a and an internal bearing 513b (see FIG. 25H). With some manual "wiggling" of a wing 511 (see FIG. 25H), this accuracy can be brought down to about 0.002 inches. This "wiggling" is possible because wing 511 is relatively flexible compared to tool 11 and nacelle 207. Indeed, the final alignment of nacelle spindle 507 may be performed by wiggling wing 511. For this reason, it is preferred that tool 11 be maneuvered and repositioned manually by control button inputs into control pendant 401, instead of the use of costlier and no more accurate computerized numerical control systems.

Control pendant 401 includes an emergency stop button 415 that when depressed halts all movement and operation of tool 11. To continue, button 415 must be released by turning button 415 to an "on" position.

Figure 22A:
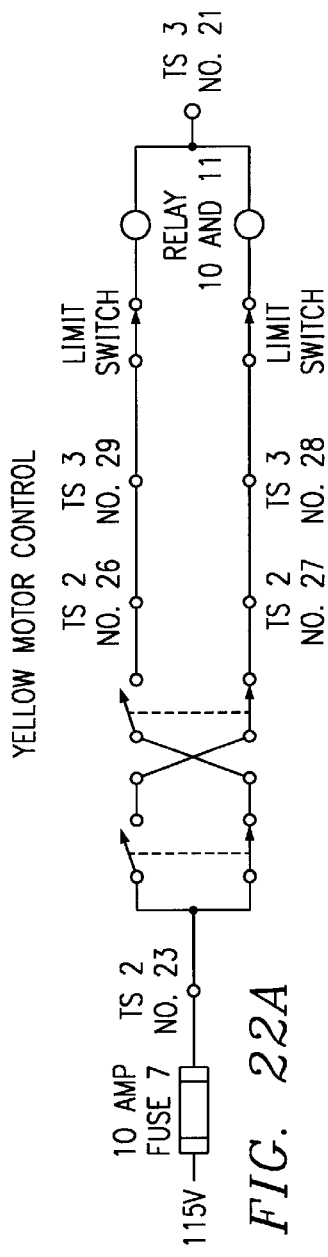
FIGS. 22A–22F are electronic circuit diagrams for electric motor controls for the tool of FIG. 1A.
Figure 22B:
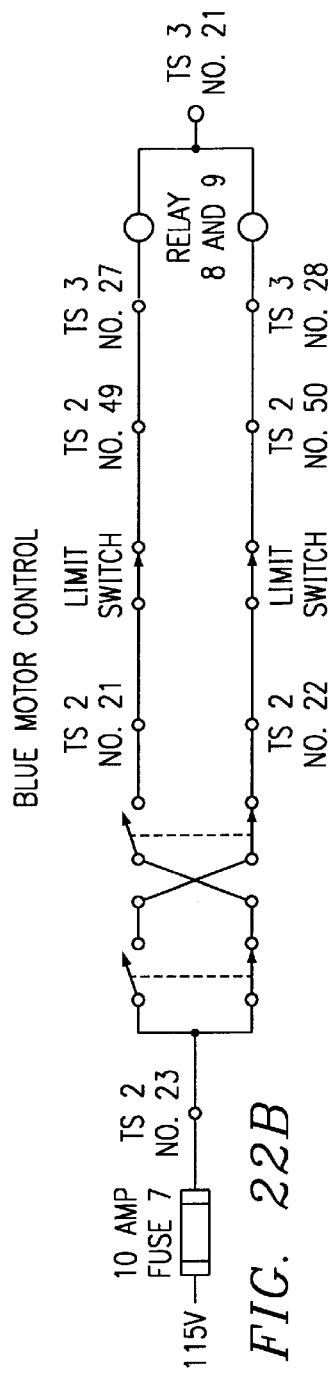
Figure 22C:
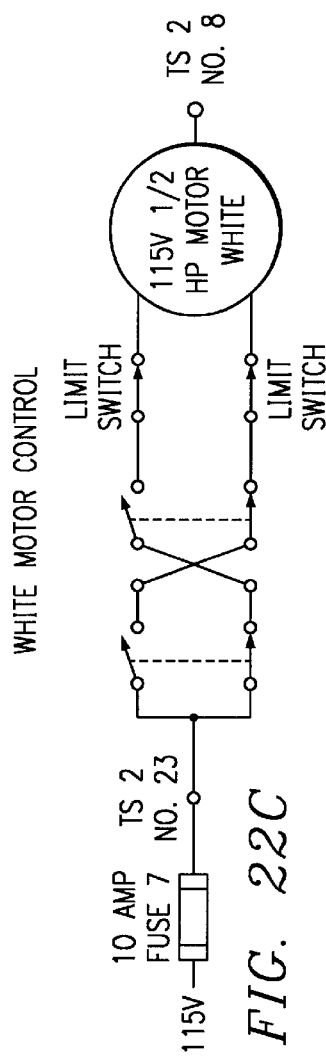
Figure 22D:
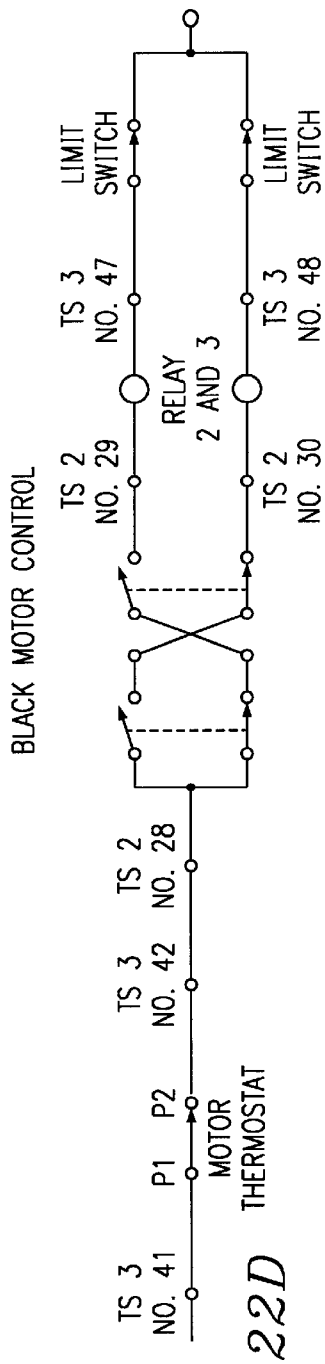
Figure 22E:
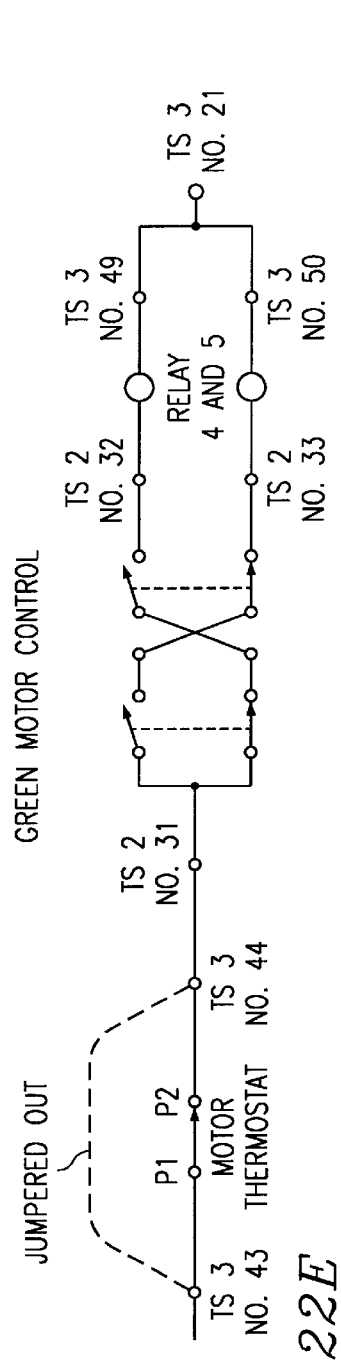
Figure 22F:
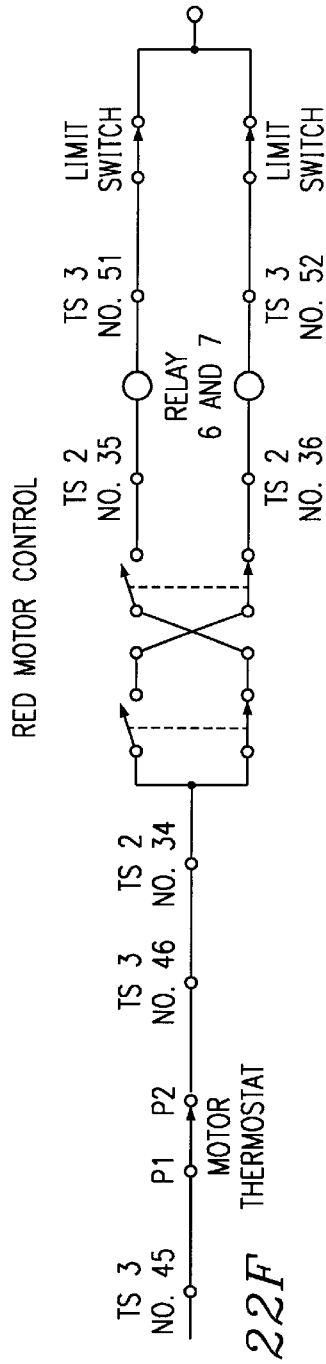
Figure 23A:
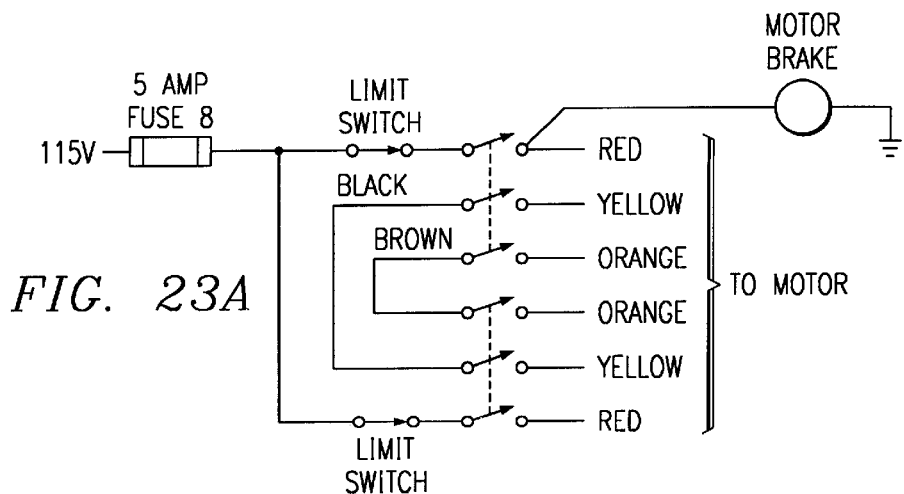
FIGS. 23A–23E are electronic circuit diagrams for motor relays for the electric motor controls of the tool of FIG. 1A.
Figure 23B:
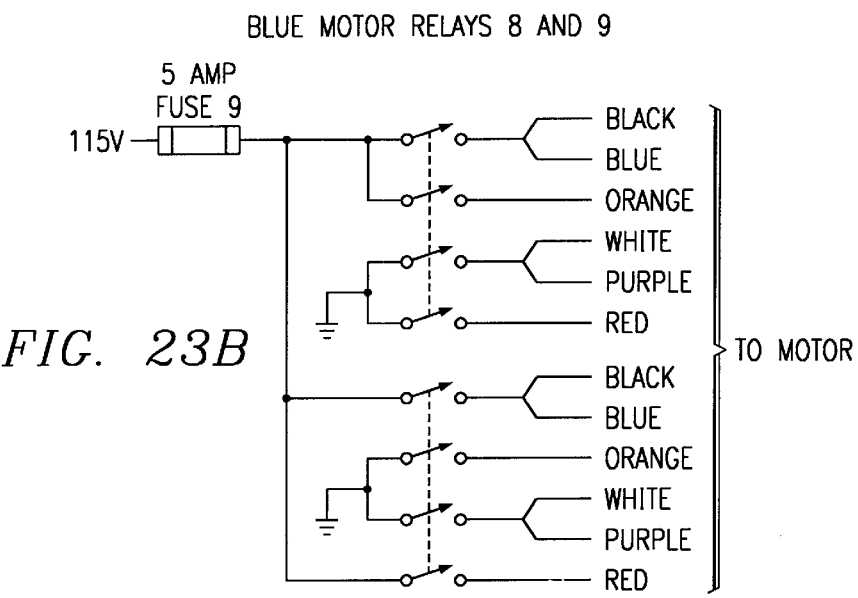
Figure 23C:
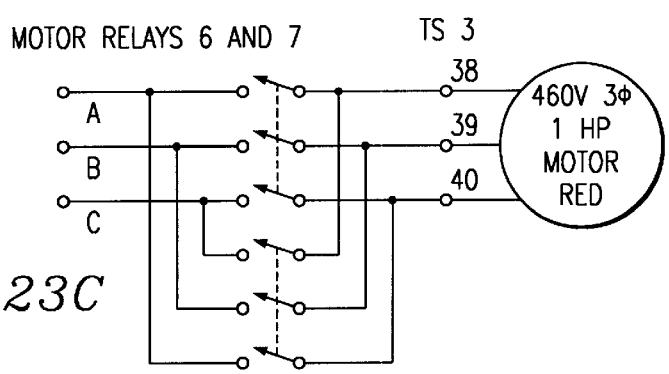
Figure 23D:
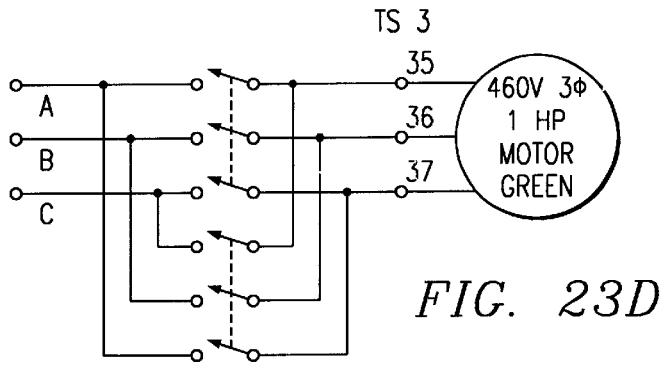
Figure 23E:
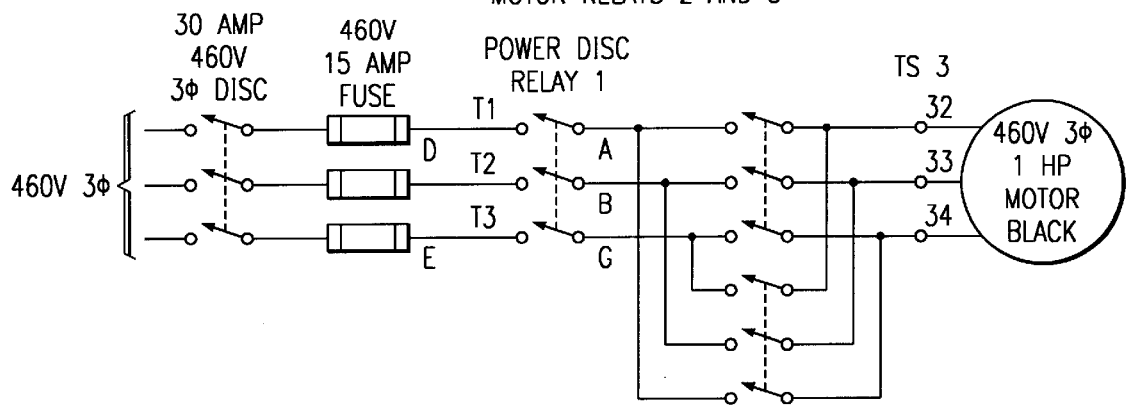

Referring now to FIGS. 22A–22F in the drawings, electrical circuit diagrams of the motor control circuits for controlling first motor 79, second motor 98, third motor 113, fourth motor 141, fifth motor 179, and sixth motor 251 are illustrated. FIG. 22A is the motor control circuit for second motor 98. FIG. 22B is the motor control circuit for third motor 113. FIG. 22C is the motor control circuit for first motor 79. FIG. 22D is the motor control circuit for fourth motor 141. FIG. 22E is the motor control circuit for sixth motor 251. FIG. 22F is the motor control circuit for fifth motor 179. It should be understood that other electrical circuits may be employed to control motors 79, 98, 113, 141, 179 and 251 in a similar fashion.

Referring now to FIGS. 23A–23E in the drawings, electrical circuit diagrams for motor relay circuits for first motor 79, second motor 98, third motor 113, fourth motor 141, fifth motor 179 and sixth motor 251 are illustrated. It should be understood that other electrical circuits may be employed to control motors 79, 98, 113, 141, 179 and 251 in a similar fashion.

Figure 24A:
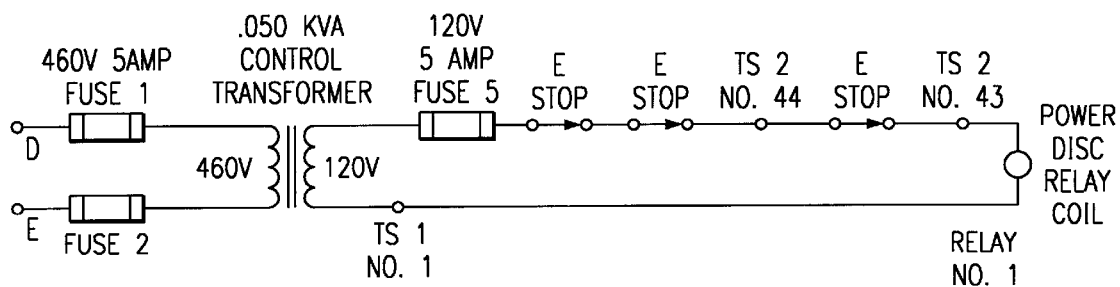
FIGS. 24A and 24B are electronic circuit diagrams for a power system for the tool of FIG. 1A.
Figure 24B:
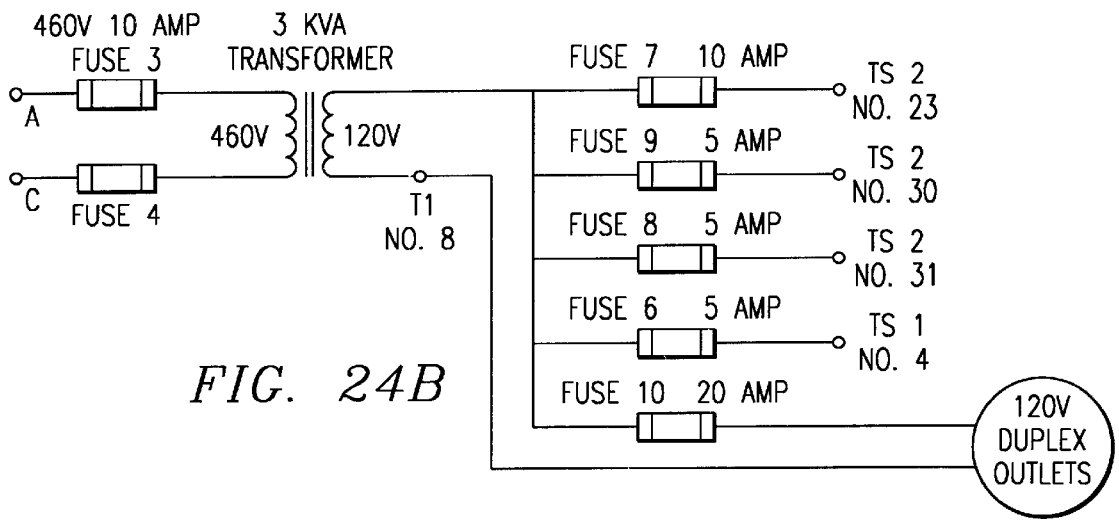
Figure 25A:
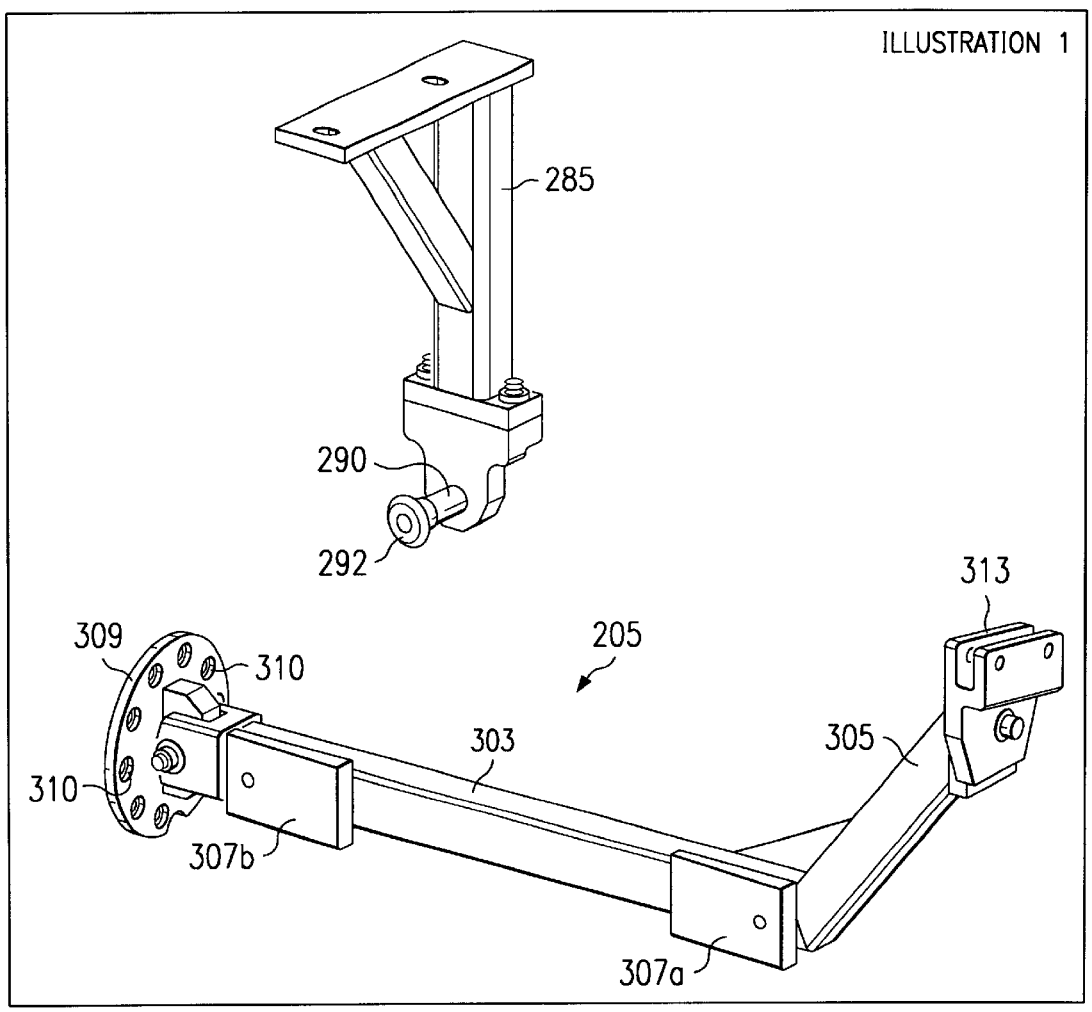
FIGS. 25A–25I are perspective views illustrating a procedure for using the tool of FIG. 1A to install a left-hand, tilt rotor engine and nacelle onto the wing of a tilt rotor aircraft.
Figure 25B:
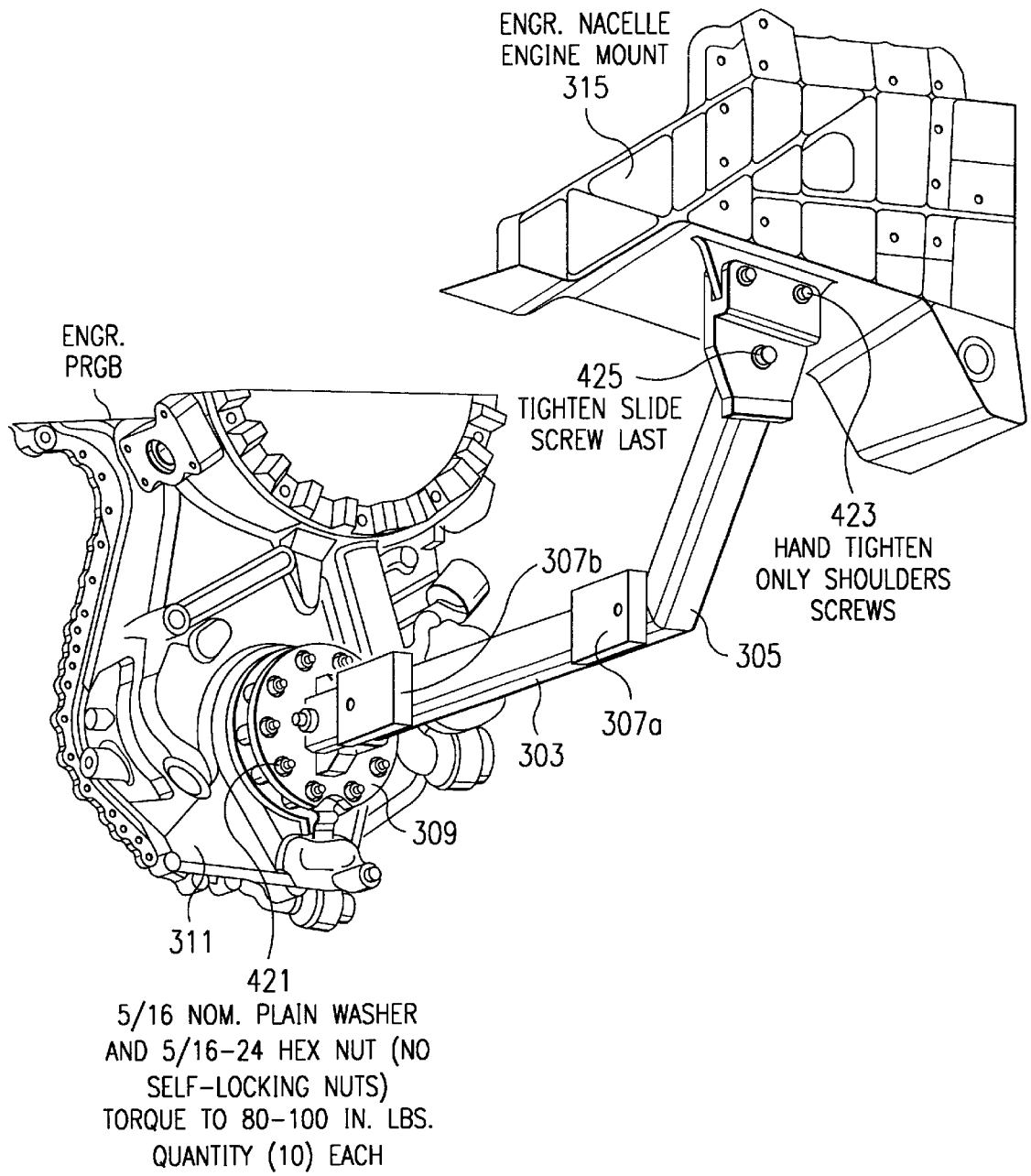
Figure 25C:
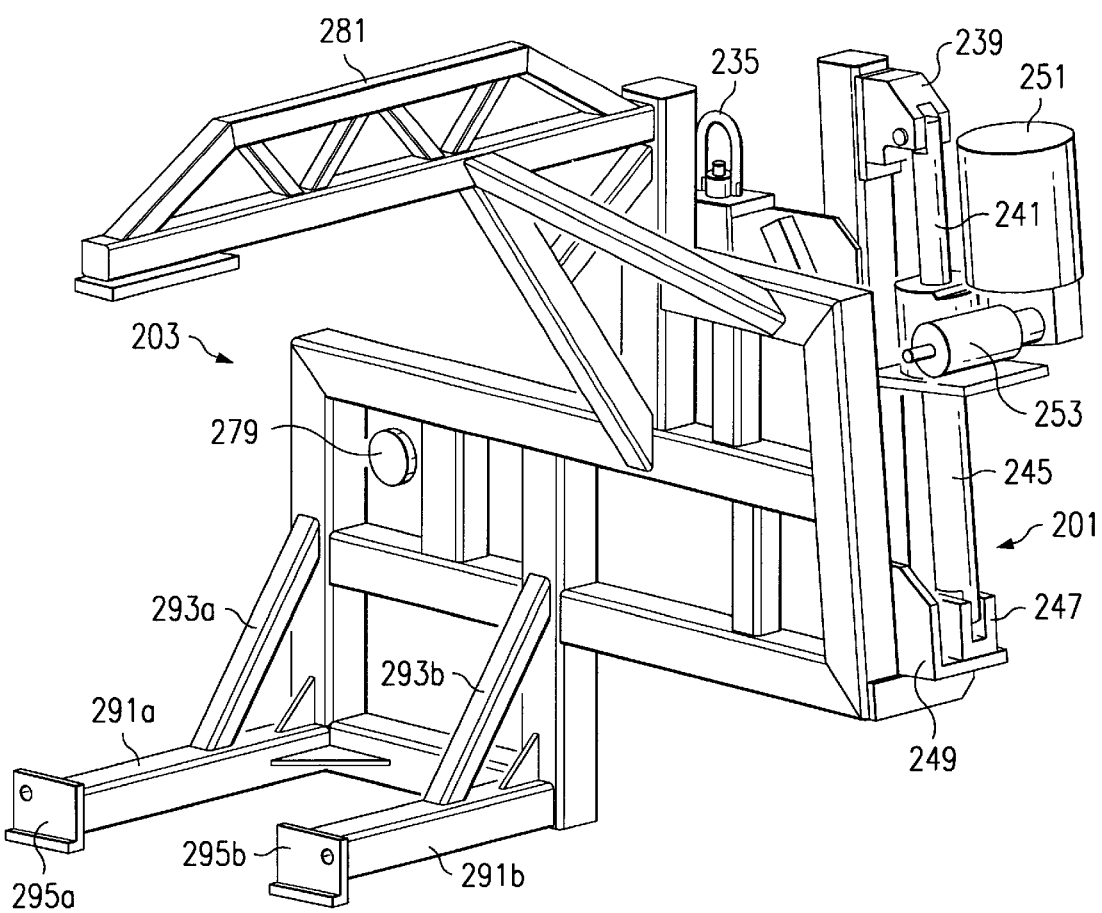
Figure 25D:
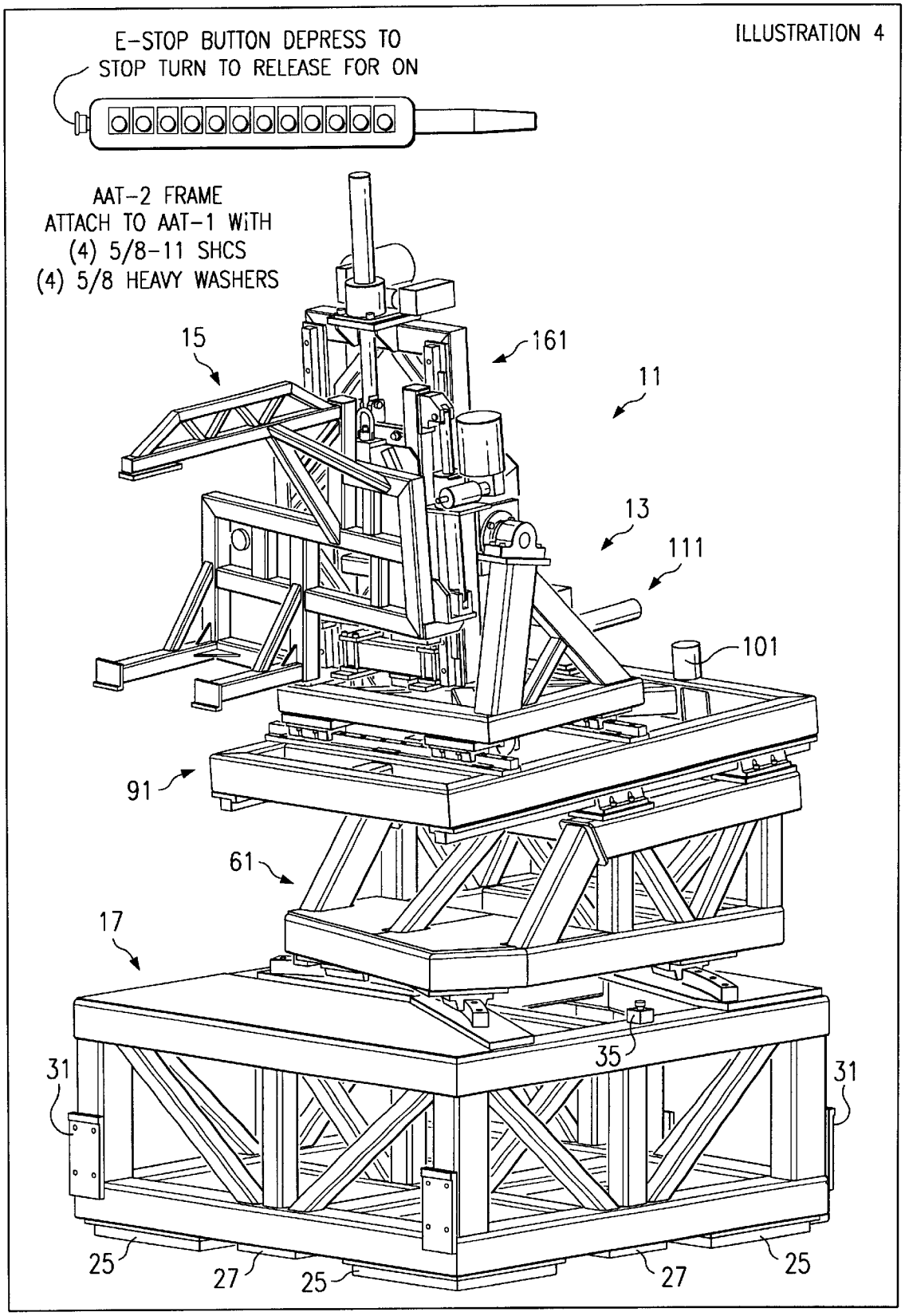
Figure 25E:
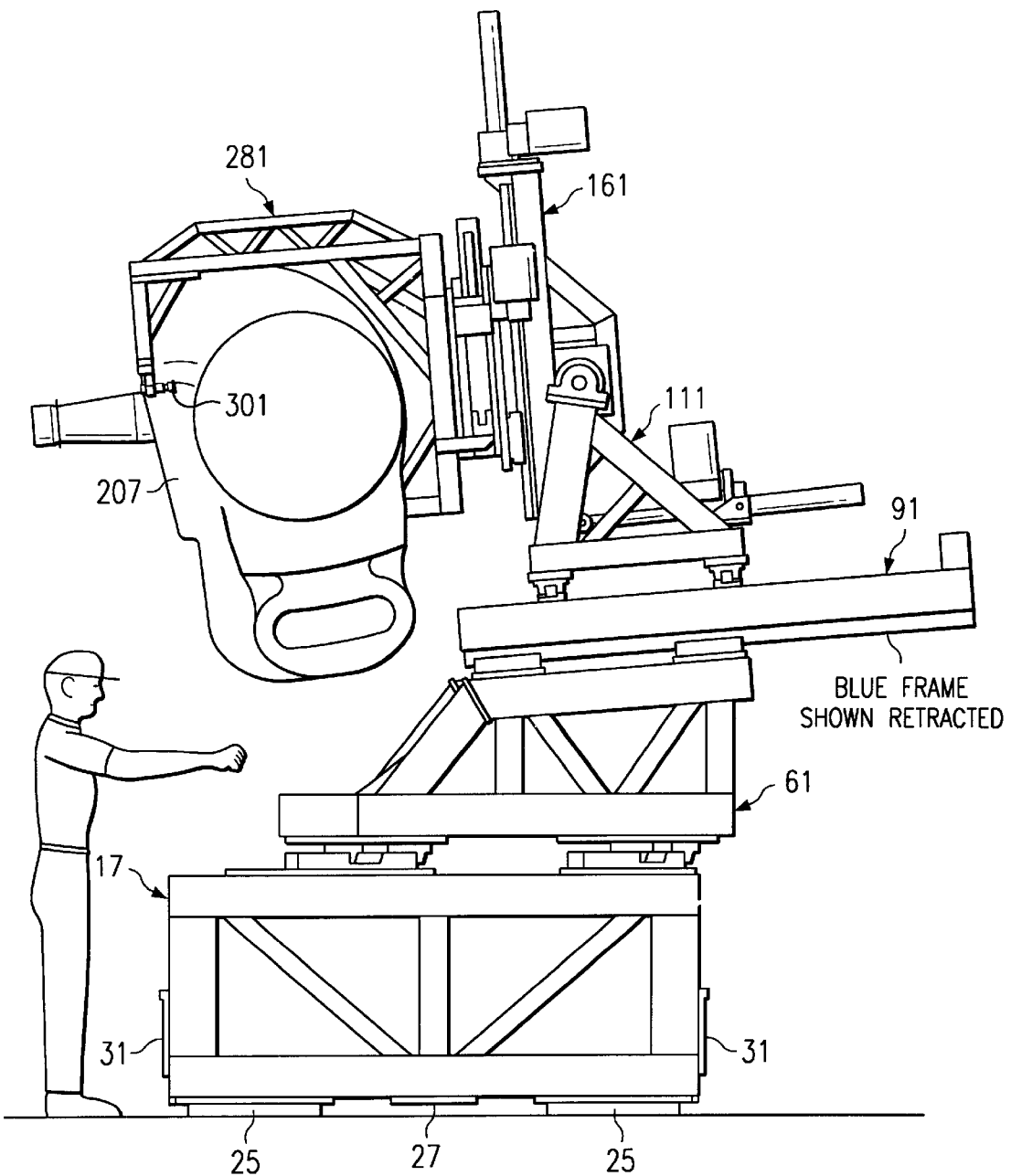
Figure 25F:
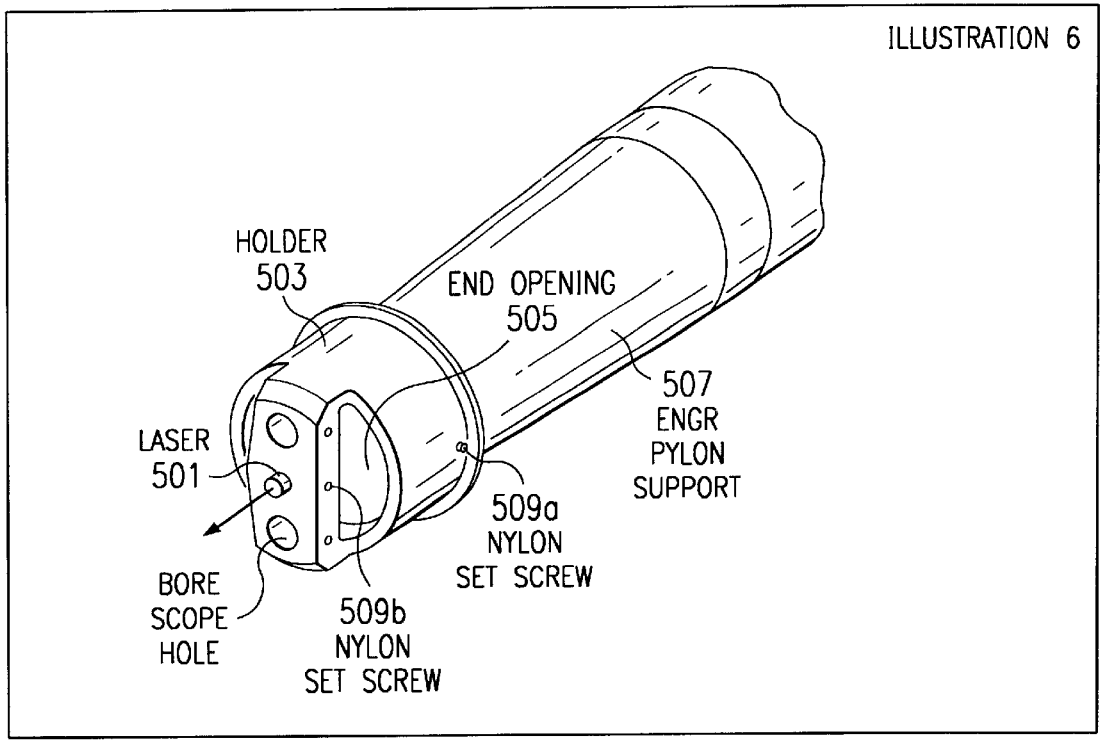
Figure 25G:
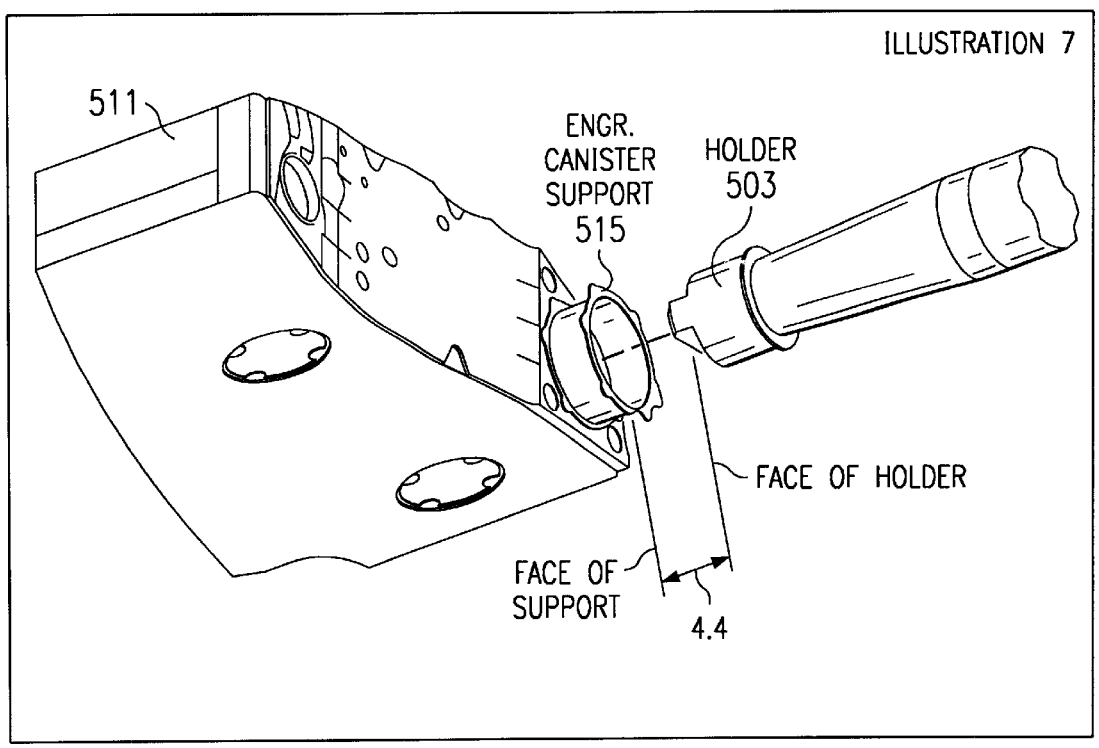
Figure 25H:
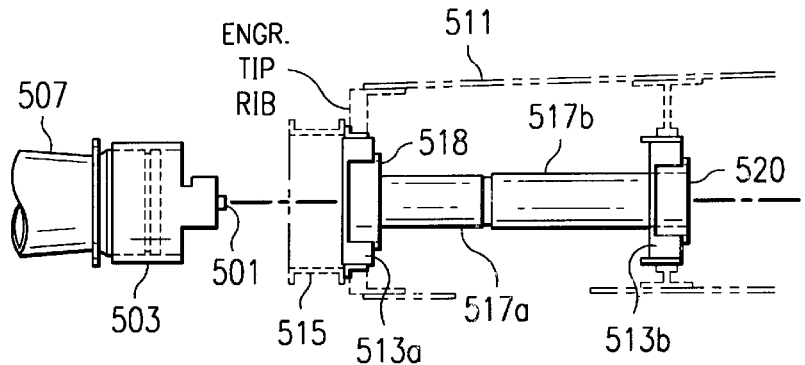
Figure 25I:
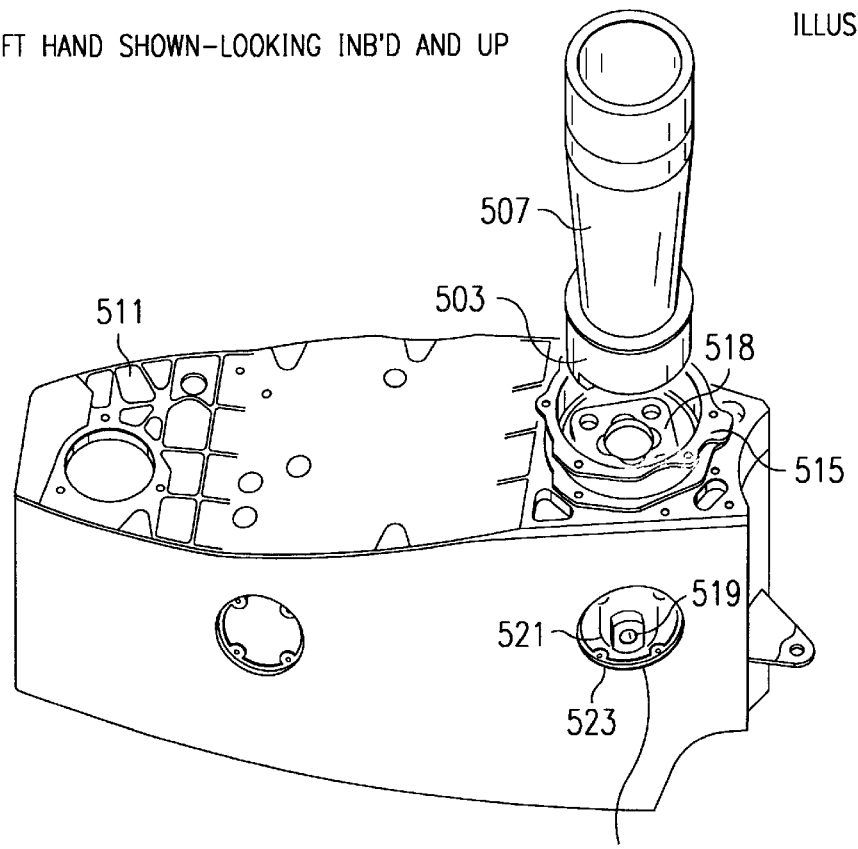

Referring now to FIGS. 24A and 24B in the drawings, electrical circuit diagrams for a power control system for tool 11 are illustrated. It should be understood that other electrical circuits may be employed for the power control system of tool 11.

The following are the preferred electrical specifications and for tool 11. It is preferred that 440 Volts of power be available for use by tool 11. A power box (not shown) with a minimum capacity of 460 Volts, a primary on/off lever, and fuse or circuit breaker protection is preferred. A 3,000 VA capacity transformer box for bringing down some of the power to a level of 110 Volts is preferred; however, some of the electrical motors require 460 Volts. Turning on the main power lever (not shown) will turn on safety light 101. Emergency stop buttons 35 are wired to de-activate any and all motors, both 110 Volt and 440 Volt, and safety light 101. Releasing emergency stop button 415 will turn safety light back on, and cause the motors to become ready for another input command from control pendant 401. It is preferred that turning back on the power or re-setting emergency stop buttons 35 or 415 will not cause any powered movement.

It is preferred that the limit switches, such as limit switches 115, are wired so that when tripped, any further movement in that particular direction is halted. However, the control button for movement in the opposite direction will still be operational by depressing the opposite direction control button. Depression of the opposite direction button will re-activate the tripped control button. Activation of any limit switch will not affect any other limit switches, motors, or movements. It should be understood, that the mechanical limiting of sixth motor 251 has similar results.

Interchangeable unit 15 has a power cable (not shown) included as a part of interchangeable unit 15. The power cable is secured to sixth motor 251 and secured to back plate component 201 with a conduit clamp (not shown) to insure there is no stress or stain on the cable/motor connection. The motor brakes (not shown) are installed so as to engage second motor 98 and third motor 113 when second motor 98 and third motor 113 are off. Rigid electrical conduit should be used where possible. However, flexible conduit or shielded cable should be used for moving motors. The style and material of the flexible conduit is option as long as the installation is safe and performed to common electrical standards. Portable control pendant 401 is connected to the power box, preferably with a cable that is at least fifteen feet long. The cable has minimal shielding protection in order to minimize the weight the operator has to tow around.

Referring now to FIGS. 25A–25I in the drawings, the procedures and steps for using tool 11 in the preferred embodiment of installing tilt rotor nacelles onto the wings of tilt rotor aircraft are illustrated and described. As stated above, six-axis alignment and installation tool 11 may be used in a wide variety of applications, particularly any application in which it is advantageous to employ interchangeable components having one or more degrees of freedom. Tool 11 is well suited to precisely hoist, maneuver, align, and couple heavy machine components together. However, the preferred embodiment of the present invention is the precision installation of the nacelles of tilt rotor aircraft onto the wings of the aircraft.

The first step is to couple engine arm component 205 to nacelle 207 while nacelle 207 is still on the nacelle build-up stand (not shown). This is done by mating attachment flange 309 to prop rotor gear box 311, placing washers (not shown) in place, and tightening nuts 421. A slide screw 425 on rear support is loosened until a plurality of shoulder screws 423 are aligned and finger tightened. Then slide screw 425 is tightened. Attachment member 285 is then removed from extension assembly 281.

Interchangeable unit 15 is then coupled to base unit 13 by lifting interchangeable unit 15 up at lift hook 235 with a crane with other lift mechanism (not shown) and moving interchangeable unit 15 into contact with base unit 13. Interchangeable unit 15 is then electrically connected to base unit 13. Portable control pendant 401 is then able to control all of the movements of tool 11. All debris on the ground between tool 11 and the nacelle build-up stand (not shown) is then cleared away.

With all emergency stop buttons 35 and 415 pushed into the "stop" position, and with all power to tool 11 off, the electrical power cord is plugged into the power source. The power lever is then moved into the "on" position. All emergency stop buttons 35 and 415 are then switched into the "on" position. Safety light 101 will then illuminate. Sixth motor 251 is then activated to level interchangeable unit 15 with the ground. Then the other five motors are activated to center the remaining components in the middle of their travel limits. Then, all emergency stop buttons 35 and 415 are placed in the "stop" position, and the power lever is switched to "off." Tool 11 is now ready to be levitated and transported by air bearings 25.

With the air bearing pump valve (not shown) in the "off" position, air bearings 25 are connected to the source of compressed air. The compressed air is then turned on for air bearings 25 to a predetermined pressure and flow rate such that tool 11 rises approximately two inches. Tool 11 is then manually maneuvered until attachment pads 295a and 295b are roughly aligned with attachment pads 307 and 307b, but still outside nacelle 207 by about three inches. Air bearings 25 are then shut down such that tool 11 rests again on the ground.

Then, the power is restored to tool 11 and emergency stop buttons 35 and 415 are switched to the "on" position. Attachment pads 295a and 295b are then brought into contact with attachment pads 307 and 307b by use of control pendant 401; however, attachment pads 295a and 295b are not bolted to attachment pads 307 and 307b at this time. Attachment member 285 is then loosely attached to extension member 281. Using control pendant 401, small positional adjustments are made to allow the conversion arm pin 290 to go into nacelle 207. Conversion arm nut 292 is then hand tightened. Then, using control pendant 401, small positional adjustments are made to mate engine bar component 205 and lift frame component 203.

At this time, nacelle 207 is ready to be freed from the nacelle build-up stand. Nacelle 207 is lifted up by using red button 409b of control pendant 401. Nacelle 207 is then retracted using blue button 413a. Nacelle 207 is retracted until upper plate component 91 is about 0.5 inches from the fully retracted position. Then, emergency stop buttons 35 and 415 are depressed and the power to tool 11 is shut down.

At this stage, air bearings 25 are activated and used to levitate tool 11 about two inches off of the ground. Tool 11 is then manually pushed clear of the nacelle build-up stand. Then, air bearings 25 are shut down so that tool 11 again rests on the ground. The power to tool is then turned back on. Emergency stop buttons 35 and 415 are then turned to the "on" position. Using red button 409a, nacelle 207 is lowered to a travel mid-point. Then emergency stop buttons 35 and 415 are depressed to halt tool 11, and the power to tool 11 is shut down.

Tool 11 includes a precision targeting system. The targeting system includes a conventional laser 501 that is installed into a laser holder 503. The associated electrical wires (not shown) are fed back through an end opening 505. Laser holder 503 is then slid onto a nacelle spindle 507 and secured by a plurality of nylon set screws 509a and 509b. Laser 501 is not connected to a power source at this time. A wing 511 is then raised and leveled while attached to a wing build-up stand (not shown) to the same height as nacelle 207, and preferably in a horizontal position. It may be necessary to use a wing jack (not shown) on the opposite wing to accomplish this alignment.

At this stage, air bearings 25 are activated, such that tool 11 and nacelle 207 are raised approximately two inches off of the ground. Then, tool 11 is manually maneuvered toward wing 511 and roughly aligned with a tip-rib spherical bearing 513a and an internal spherical bearing 513b, maintaining a clearance between the face of laser holder 503 and the face of a support canister 515 of about 4.4 inches±about one inch. Then, air bearings 25 are turned off while maintaining the position of tool 11 until tool 11 comes to rest on the ground. Alignment target sleeves 517a and 517b are then installed through tip-rib bearing 513a and internal bearing 513b. Alignment target sleeve 517a includes an external end cap 518, and alignment target sleeve 517b includes an internal end cap 520. Alignment target sleeve 517b also includes a tube sight hole 519 positioned such that cross hairs (not shown) on the center of internal end cap 520 can be seen by the operator through an aperture 521 in wing 511. Then, laser 501 is connected to a power source (not shown). Then, the electrical power to tool 11 is turned on and emergency stop buttons 35 and 415 are switched to the "on" position.

Laser 501 is then aligned with the cross hairs on internal end cap 520 by using control pendant 401 and visual inspection through aperture 521. After this initial laser alignment, alignment target sleeves 517a and 517b are carefully removed, such that rib-tip spherical bearing 513a and internal spherical bearing 513b are not moved out of alignment. A sleeve target 523 is installed into internal spherical bearing 513b in the place of alignment target sleeve 517b. Using button 413b on control pendant 401, nacelle 207 is slowly moved forward to confirm alignment. If the dot created by laser 501 on sleeve target 523 moves off of the target cross hairs, the direction is noted, nacelle 207 is withdrawn, and alignment target sleeves 517a and 517b are reinstalled, and the initial laser alignment steps are repeated.

Once an acceptable alignment has been achieved, nacelle 207 is completely withdrawn. Then laser 501 is shut down and removed by removing laser holder 503 from nacelle spindle 507. Then, sleeve target 523 is removed from internal spherical bearing 513b. As a protective measure, the end threads of nacelle spindle 507 are wrapped with Teflon tape (not shown). At this point, it is important that wing 511 be kept stationary. Then, using button 413b on control pendant 401, the nacelle is slowly moved forward to begin the installation of nacelle 207 onto wing 511. Conventional bore scopes (not shown) should be used to monitor the advancement of nacelle spindle 507 into wing 511. Any other adjustments to tool 11 should be made as necessary. Nacelle 207 should be advanced inwardly until nacelle spindle 507 has reached an appropriate position. It may be necessary to manually "wiggle" either nacelle 207 or wing 511 slightly to obtain the necessary clearances.

Once nacelle 207 has been properly installed into wing 511, the Teflon tape is removed from the end threads of nacelle spindle 507, and nacelle spindle 507 is securely fastened in place. Then, engine arm component 205 is loosened from prop rotor gearbox 311 and engine mount 315. Attachment member 285 is then loosened from tilt rotor nacelle support 301 (see FIG. 17A). Final inward adjustments may be made by tightening nacelle spindle 507 into place. After all necessary connections are made, engine arm component 205 and attachment member 285 are completely removed. Then, tool 11 is backed away using button 413a on control pendant 401. The above procedure is then repeated for the other nacelle of the tilt rotor aircraft.

Tool 11 and the specifications and procedures set forth herein provide significant savings in time, labor, and materials. Fewer people can install nacelles onto tilt rotor aircraft in a significantly reduced amount of time. Because tool 11 can maneuver a nacelle with very high precision, the risk of damage to these expensive parts is dramatically reduced. Because tool 11 has two modes of transportation, the present invention allows certain repairs or installations to be performed on an aircraft without bringing the aircraft into the assembly plant. The present invention improves safety by reducing the number of people required to install a nacelle, and by eliminating the need for overhead cranes. It should be understood that the above procedure would be modified for other applications. Additional steps may be necessary, and some steps would be omitted.

It should be apparent from the foregoing that an invention having significant advantages has been provided. While the invention is shown in only one of its forms, it is not just limited but is susceptible to various changes and modifications without departing from the spirit thereof.

I claim:

1. An alignment and installation tool having multiple degrees of freedom, the alignment and installation tool comprising:
   a base unit; and
   a plurality of interchangeable units, each interchangeable unit being configured to be releasably coupled to the base unit;
   wherein the base unit provides three separate and independent translational degrees of freedom and two separate and independent rotational degrees of freedom, and each interchangeable unit provides one separate and independent rotational degree of freedom when the interchangeable unit is coupled to the base unit.

2. The alignment and installation tool according to claim 1, wherein the base unit comprises:
   a stationary base support component;
   a mid-level component pivotally coupled to the base support component;
   an upper plate component slidingly coupled to the mid-level component;
   a trunnion component slidingly coupled to the upper plate component, the trunnion component forming a horizontal axis of rotation; and
   a tilting component pivotally coupled to the trunnion component so as to rotate about the horizontal axis of rotation.

3. The alignment and installation tool according to claim 1, wherein each interchangeable unit comprises:
   a back plate component releasably coupled to the base unit;
   a lift frame component pivotally coupled to the back plate component; and
   an engine arm component releasably coupled to lift frame component.

4. The alignment and installation tool according to claim 3, wherein at least one of the back plate component, the lift frame component, or the engine arm component of one interchangeable unit is a mirror image of the corresponding component on another interchangeable unit.

5. The alignment and installation tool according to claim 1, further comprising:
   a first mode of transportation for transporting the alignment tool in a controlled environment; and
   a second mode of transportation for transporting the alignment tool in an uncontrolled environment.

6. The alignment and installation tool according to claim 5, wherein the first mode of transportation is achieved by levitation on air bearings, and the second mode of transportation is achieved by rolling on removable casters.

7. The alignment and installation tool according to claim 1, further comprising:
   a targeting system for aligning the alignment and installation tool.

8. The alignment and installation tool according to claim 7, wherein the targeting system comprises:
   a laser;
   at least one target member.

9. The alignment and installation tool according to claim 1, further comprising:
   a separate electric motor for actuating the alignment and installation tool in each degree of freedom.

10. The alignment and installation tool according to claim 1, further comprising:
    a color coded control system;
    wherein each degree of freedom is indicated by a different colored visual indicia disposed at a selected location upon the alignment and installation tool.

11. A tool for aligning and installing a nacelle onto a wing of a tilt rotor aircraft, the tool comprising:
    a multi-component base unit; and
    a plurality of multi-component interchangeable units, each interchangeable unit being configured to be releasably coupled to the base unit and to be coupled to the nacelle;
    wherein the components of the base unit move relative to each other in three separate and independent translational degrees of freedom and two separate and independent rotational degrees of freedom, and the components of each interchangeable unit move in at least one rotational degree of freedom.

12. The tool according to claim 11, wherein the multi-component base unit comprises:
    a stationary base support component;
    a mid-level component pivotally coupled to the base support component;
    an upper plate component slidingly coupled to the mid-level component;
    a trunnion component slidingly coupled to the upper plate component; and
    a tilting component pivotally coupled to the trunnion component;
    and wherein each multi-component interchangeable unit comprises:
    a back plate component releasably coupled to the base unit;
    a lift frame component pivotally coupled to the back plate component; and
    an engine arm component releasably coupled to lift frame component.

13. The tool according to claim 12, wherein at least one of the back plate component, the lift frame component, or the engine arm component of one interchangeable unit is a mirror image of the corresponding component on another interchangeable unit.

14. The tool according to claim 12, wherein the back plate component and the lift frame component one interchangeable unit is a mirror image of the corresponding components on another interchangeable unit, and wherein the engine arm component of the one interchangeable unit is not a mirror image of the other engine arm component.

15. The tool according to claim 11, wherein the plurality of interchangeable units comprises:
    a left-hand interchangeable unit for aligning and installing a left-hand nacelle onto a left-hand wing of the tilt rotor aircraft; and a right-hand interchangeable unit for aligning and installing a right-hand nacelle onto a right-hand wing of the tilt rotor aircraft.

16. The tool according to claim 11, further comprising:

a targeting system for aligning the nacelle with the wing of the tilt rotor aircraft.

17. The tool according to claim 16, wherein the targeting system comprises:

a laser configured to be coupled to the nacelle while the nacelle is coupled to the tool; and at least one target member configured to be coupled to the wing of the tilt rotor aircraft.

18. The tool according to claim 11, further comprising:

air bearings coupled to the base unit to achieve a first mode of transportation for transporting the alignment tool in a controlled environment; and casters releasably coupled to the base unit to achieve a second mode of transportation for transporting the alignment tool in an uncontrolled environment.

19. A tool for aligning and installing a nacelle onto a wing of a tilt rotor aircraft, the tool comprising:

a multi-component base unit; and a plurality of multi-component interchangeable units, each interchangeable unit being configured to be releasably coupled to the base unit and to be coupled to the nacelle;

wherein the components of the base unit move relative to each other in in three separate and independent translational degrees of freedom and three separate and independent rotational degrees of freedom.

20. The tool according to claim 19, wherein the components of the base unit move in six degrees of freedom, and the components of each interchangeable unit are rigidly coupled together.

* * * * *